United States Patent
Gupta et al.

(10) Patent No.: US 11,846,440 B2
(45) Date of Patent: Dec. 19, 2023

(54) DYNAMIC VENTILATION CONTROL FOR A BUILDING

(71) Applicant: Honeywell International Inc., Charlotte, NC (US)

(72) Inventors: Bhavesh Gupta, Niantic, CT (US); Manish Sharma, Alpharetta, GA (US); Prabhat Ranjan, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 17/570,978

(22) Filed: Jan. 7, 2022

(65) Prior Publication Data

US 2022/0221184 A1    Jul. 14, 2022

Related U.S. Application Data

(60) Provisional application No. 63/137,526, filed on Jan. 14, 2021.

(51) Int. Cl.
*F24F 11/00* (2018.01)
*F24F 11/65* (2018.01)
(Continued)

(52) U.S. Cl.
CPC .......... *F24F 11/65* (2018.01); *F24D 19/1048* (2013.01); *F24F 11/0001* (2013.01);
(Continued)

(58) Field of Classification Search
CPC ........ F24F 11/65; F24F 11/0001; F24F 11/47; F24F 2011/0002; F24F 2110/10;
(Continued)

(56) References Cited

U.S. PATENT DOCUMENTS 9,810,442 B2    11/2017  Matsuoka et al.
10,731,885 B2    8/2020  Ajax et al.
(Continued)

FOREIGN PATENT DOCUMENTS

KR    102383991 B1 *  4/2022

OTHER PUBLICATIONS

Cigler, et al; "Optimization of Predicted Mean Vote Index within Model Predictive Control Framework: Computationally Tractable Solution." Energy and Buildings 52, 39-49, (2012).
(Continued)

*Primary Examiner* — Alicia M. Choi
(74) *Attorney, Agent, or Firm* — Seager, Tufte & Wickhem, LLP

(57) ABSTRACT

Appropriate ventilation for a building space while maintaining building comfort includes tracking one or more interior environmental conditions within the building space and one or more exterior environmental conditions outside of the building space during operation of the HVAC system. An environmental model for the building space is learned over time based at least in part on these tracked environmental conditions, where the environmental model predicts an environmental state of the building space in response to operation of the HVAC system under various interior and exterior environmental conditions. A maximum allowed ventilation rate that can be achieved without causing the HVAC system to compromise on any of one or more comfort conditions of the building space is predicted using the environmental model. The outdoor air ventilation damper of the HVAC system is then controlled to provide an appropriate ventilation up to or at the predicted maximum allowed ventilation rate.

20 Claims, 17 Drawing Sheets

(51) Int. Cl.
*G05B 19/042* (2006.01)
*F24F 11/47* (2018.01)
*F24D 19/10* (2006.01)
*F24F 110/10* (2018.01)
*F24F 110/20* (2018.01)
*F24F 110/50* (2018.01)
*F24F 110/52* (2018.01)
*F24F 110/12* (2018.01)
*F24F 110/22* (2018.01)
*F24F 120/10* (2018.01)
*F24F 140/50* (2018.01)

(52) U.S. Cl.
CPC ............ *F24F 11/47* (2018.01); *G05B 19/042* (2013.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/50* (2018.01); *F24F 2110/52* (2018.01); *F24F 2120/10* (2018.01); *F24F 2140/50* (2018.01); *G05B 2219/2614* (2013.01)

(58) Field of Classification Search
CPC ............... F24F 2110/12; F24F 2110/20; F24F 2110/22; F24F 2110/50; F24F 2110/52; F24F 2120/10; F24F 2140/50; F24F 11/74; F24F 11/30; F24D 19/1048; G05B 19/042; G05B 2219/2614; G05B 15/02; G05B 19/0426; Y02B 30/70
See application file for complete search history.

(56) References Cited

U.S. PATENT DOCUMENTS

| | | | |
|---|---|---|---|
| 10,928,084 B2 | 2/2021 | Ajax et al. | |
| 2005/0095978 A1* | 5/2005 | Blunn | F24F 11/0001 454/229 |
| 2006/0158051 A1* | 7/2006 | Bartlett | F24F 11/0001 310/62 |
| 2008/0108295 A1* | 5/2008 | Fischer | F24F 3/1423 454/239 |
| 2008/0207109 A1* | 8/2008 | Bagwell | F24F 13/082 454/251 |
| 2009/0327949 A1* | 12/2009 | Subbian | G06F 3/0481 715/781 |
| 2013/0261809 A1* | 10/2013 | Morrow | F24F 11/62 700/278 |
| 2014/0041401 A1* | 2/2014 | Douglas | F25B 43/00 62/89 |
| 2014/0365017 A1* | 12/2014 | Hanna | F24F 11/65 700/276 |
| 2015/0336439 A1* | 11/2015 | Wang | B60H 1/00064 165/203 |
| 2016/0116181 A1 | 4/2016 | Aultman et al. | |
| 2016/0348936 A1* | 12/2016 | Johnson, Jr. | G05B 15/02 |
| 2018/0347837 A1* | 12/2018 | Nugrahani | F24F 11/0001 |
| 2019/0032945 A1* | 1/2019 | Willmott | G05B 13/042 |
| 2021/0080915 A1* | 3/2021 | Yan | F24F 11/46 |
| 2021/0404695 A1* | 12/2021 | Saito | F24F 11/77 |
| 2022/0165433 A1* | 5/2022 | Schimmoller | A61B 5/00 |

OTHER PUBLICATIONS

Cigler, et al; "On the Selection of the Most Appropriate MPC Problem Formulation for Buildings." In11th REHVA World Congress CLIMA 2013, No. CONF. 2013.

Walker, et al; "Application of Distributed Model Predictive Approaches to Temperature and CO2 Concentration Control in Buildings." IFAC-PapersOnLine50, No. 1 (2017): 2589-2594, 2017.

Ranmanesh et al; "Soft Switching Model Predictive Control with an Increase in the Security of Calculations and Information." J. Comput., 13(9), 1115-1126 (2018).

Drgona, et al; "All you need to know about Model Predictive Control for Buildings." Annual Reviews in Control (2020).

Chen et al; "Indoor Air Quality Monitoring System for Smart Buildings," UbiComp, Seattle, Washington, 5 pages, 2014.

Reset Pre-Release, 96 pages, 2017.

* cited by examiner

206

208

Selecting a ventilation mode from a plurality of ventilation modes, wherein the plurality of ventilation modes comprises:

208a

A first ventilation mode that attempts to minimize energy consumed by the HVAC system to condition air supplied to the building space while maintaining one or more IAQ contaminants in the building space below one or more corresponding first predetermined limits 208b A second ventilation mode that attempts to minimize energy consumed by the HVAC system condition air supplied to the building space while maintaining one or more IAQ contaminants in the building space below one or more corresponding second predetermined limits, wherein at least one of the second predetermined limits is below a corresponding one of the first predetermined limits

210

Controlling the one or more components of the HVAC system, including the outdoor air ventilation damper, in accordance with the selected ventilation mode

FIG. 14

DYNAMIC VENTILATION CONTROL FOR A BUILDING

RELATED APPLICATIONS

This application claims the benefit of priority under 35 U.S.C. § 119 to U.S. Provisional Application Ser. No. 63/137,526, filed Jan. 14, 2021, the entirety of which is incorporated herein by reference.

TECHNICAL FIELD

The present disclosure relates generally to control of Heating, Ventilating and Air Conditioning (HVAC) systems. More particularly, the present disclosure relates to methods and systems of determining ventilation rates for an HVAC system.

BACKGROUND

HVAC systems provide conditioned air for heating and cooling the interior of a building. Some HVAC systems also can provide fresh air ventilation into the building while exhausting an equivalent amount of inside air. Such fresh air ventilation is useful in reducing contaminates produced in the building. However, there are often costs involved in conditioning the fresh air before it can be deployed in the building. For example, in the winter, the fresh air must typically be heated by the HVAC system, and in some cases, humidity must be added. Likewise, in the summer, the fresh air must typically be cooled by the HVAC system, and in some cases, humidity must be removed. Thus, to reduce operating costs, it is often desirable to minimize the ventilation rate while still adequately ventilating the building given the current contaminates or expected contaminates in the building.

Under some conditions, such as during a pandemic, it may be desirable to prioritize an increased ventilation rate over energy costs to help reduce the spread of pathogens within the building. Under these conditions, if the ventilation rate is set too high, given the current indoor and outdoor conditions, the HVAC system may lack the heating and/or cooling capacity to adequately condition the incoming fresh air while still maintaining occupant comfort in the building.

What would be desirable are methods and systems for automatically determining a ventilation rate for a building, given the current indoor and outdoor conditions, and dynamically controlling the HVAC system in accordance with the determined ventilation rate.

SUMMARY

The present disclosure relates to methods and systems of determining ventilation rates for an HVAC system. In one example, a method provides up to a maximum ventilation for a building space while not compromising on one or more comfort conditions in the building space. This illustrative method includes tracking one or more interior environmental conditions within the building space and one or more exterior environmental conditions outside of the building space during operation of the HVAC system. An environmental model for the building space is learned over time based at least in part on the tracked one or more interior environmental conditions within the building space and the one or more exterior environmental conditions outside of the building space during operation of the HVAC system. The learned environmental model is configured to predict an environmental state of the building space in response to operation of the HVAC system under various interior and exterior environmental conditions. A current maximum allowed ventilation rate that can be achieved without causing the HVAC system to compromise on any of the one or more comfort parameters of the building space is predicted. This may include inputting to the learned environmental model one or more current comfort parameters associated with the one or more comfort conditions of the building space, one or more current interior environmental conditions, and one or more current exterior environmental conditions. Once the current maximum allowed ventilation rate is predicted, an outdoor air ventilation damper of the HVAC system is controlled to provide ventilation up to or at the current maximum allowed ventilation rate.

In another example, a method provides a dynamic ventilation rate for a building space using a Heating, Ventilating and/or Air Conditioning (HVAC) system. This illustrative method includes tracking over time one or more interior environmental conditions within the building space and one or more exterior environmental conditions outside of the building space during operation of the HVAC system. An environmental model for the building space is learned over time based at least in part on the tracked one or more interior environmental conditions and the one or more exterior environmental conditions during operation of the HVAC system. The learned environmental model is configured to predict an environmental state of the building space in response to operation of the HVAC system under various interior and exterior environmental conditions. A dynamic ventilation rate for the HVAC system of the building space is determined based at least in part on inputting to the environmental model of the building space one or more interior environmental conditions and one or more exterior environmental conditions, wherein the determined dynamic ventilation rate is capped to allow the HVAC system to not compromise on one or more comfort conditions in the building space. An outdoor air ventilation damper of the HVAC system is then controlled in accordance with the determined dynamic ventilation rate.

In another example, a method for controlling an outdoor air ventilation damper of a Heating, Ventilating and/or Air Conditioning (HVAC) system serving a building space of a building is provided. The illustrative method include receiving one or more interior environmental conditions within the building space, one or more exterior environmental conditions outside of the building space, and one or more operating conditions of the HVAC system over time. A measure of current unused heating and/or cooling capacity of the HVAC system is determined based at least in part on the one or more operating conditions of the HVAC system. A maximum ventilation parameter is determined that is representative of a rate of outside air having the one or more exterior environmental conditions that can be conditioned by the measure of current unused heating and/or cooling capacity of the HVAC system while still maintaining the one or more comfort conditions for the building space. A ventilation rate is determined based at least in part on the maximum ventilation parameter, and the determined ventilation rate is sent for use in controlling the outdoor air ventilation damper of the HVAC system.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 14 is a flow diagram showing an illustrative method;

Figure 1:
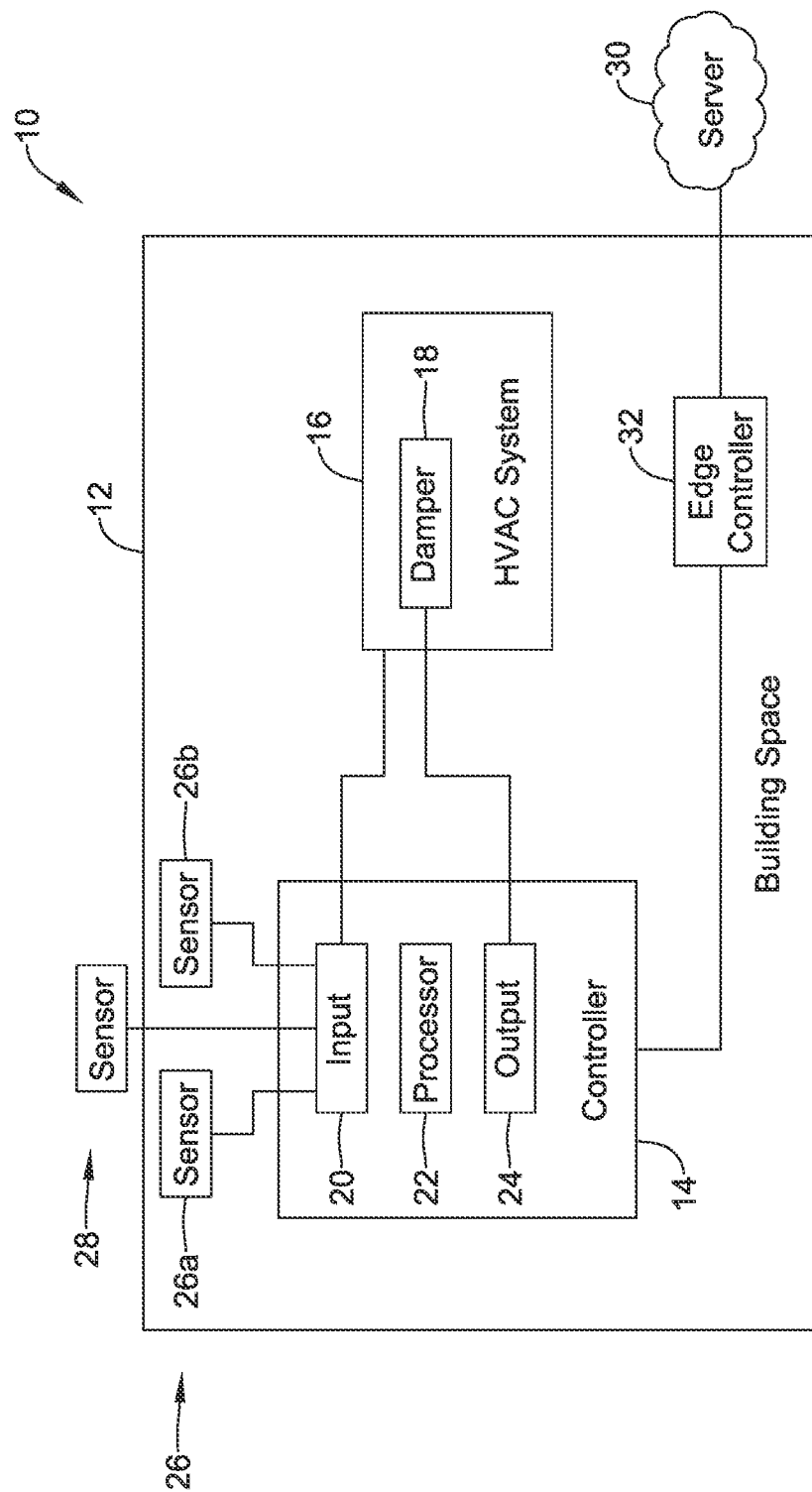
FIG. 1 is a schematic block diagram of an illustrative HVAC control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative HVAC control system 10. In the example shown, a building space 12 includes a controller 14 that is configured to control at least some features and operations of an HVAC system 16. The building space 12 may represent the interior of an entire building, or only part of a building. The controller 14 may control operation of a damper 18 that is part of the HVAC system 16 and that functions to control the relative flow of fresh outside air into the building space 12 through the ductwork (not shown) that provides conditioned air to various parts of the building space 12. The controller 14 may control other features and components of the HVAC system 16 as well. The controller 14 may operate in accordance with various HVAC standards such as but not limited to ASHRAE 62.1 to provide appropriate volumes of fresh air to the building space 12. Providing fresh air can provide the interior of the building space 12 with healthier air that contains relatively less of various contaminants than the interior air in the building space 12 would otherwise have, as outdoor air can be substantially cleaner than indoor air. Providing fresh air can also help with comfort, such as if the building space 12 is currently warmer than a temperature setpoint but the outside air is cool enough that it can be used to help cool the building space 12 down to its temperature setpoint. This is just an example.

The illustrative controller 14 includes an input 20 for receiving one or more interior environmental conditions within the building space 12 as well as for receiving one or more exterior environmental conditions outside of the building space 12. The input 20 may also receive one or more operating conditions of the HVAC system 16 over time. In the example shown, the controller 14 includes a processor 22 that is operatively coupled to the input 20 such that the processor 22 can track over time one or more environmental conditions within the building space 12 and also track over time one or more exterior environmental conditions outside of the building space 12. The processor 22 may also track one or more operating conditions of the HVAC system 16 over time, and correlate in time the one or more operating conditions of the HVAC system 16 with the one or more environmental conditions within the building space 12, the one or more exterior environmental conditions outside of the building space 12, and/or any other suitable conditions or parameters. While a single processor 22 is shown, it will be appreciated that the controller 14 may include two, three or more distinct processors 22. In cases where the controller 14 includes multiple processors 22, the functionality of the controller 14 may be divided between the two, three or more distinct processors 22, and in some cases, may be distributed amount a plurality of different locations.

In the example shown, the processor 22 may be configured to learn an environmental model for the building space 12 based at least in part on the tracked one or more interior environmental conditions within the building space 12 and the one or more exterior environmental conditions outside of the building space 12 during operation of the HVAC system 16. The learned environmental model is configured to predict an environmental state of the building space 12 in response to operation of the HVAC system 16 under various interior and exterior environmental conditions. The processor 22 may be configured to determine a dynamic ventilation rate for the HVAC system 16 of the building space 12 based at least in part on inputting to the environmental model of the building space 12 one or more current interior environmental conditions and one or more current exterior environmental conditions. The illustrative controller 14 further includes an output 24 for sending the determined dynamic ventilation rate to the HVAC system 16 for controlling the outdoor air ventilation damper 18 of the HVAC system 16.

In some cases, the processor 22 is configured to predict a current maximum allowed ventilation rate that can be achieved without causing the HVAC system 26 to compromise on any of one or more comfort conditions of the building space. The HVAC system 16 may control the outdoor air ventilation damper 18 to provide ventilation up to or at the current maximum allowed ventilation rate.

In the example shown, the building space 12 may include one or more sensors 26, individually labeled as 26a and 26b. While two sensors 26 are shown, it will be appreciated that this is merely illustrative, as the building space 12 may include any number of sensors 26, and may include only one sensor 26 or may include three, four, five or even substantially more sensors 26. At least some of the sensors 26 may be hard-wired to the input 20. At least some of the sensors 26 may be wirelessly coupled to the input 20. The sensors 26 may represent any of a variety of different types of sensors. The sensors 26 may be configured to provide signals representing one or more interior environmental conditions to the input 20. The sensors 26 may include temperature sensors, humidity sensors, $CO_2$ sensors and sensors configured to detect other indoor pollutants such as particulate matter (PM), volatile organic compounds (VOCs) and the like. The sensors 26 may include occupancy sensors, such as motion sensors, video camera sensors coupled with video analytics that in some cases can identify and maintain a count and/or density of people in the building space, a time of flight (e.g. LIDAR) sensor that can detect and in some cases maintain a count and/or density of people in the building space, a milli-meter wave sensor (e.g. Radar) that can detect and in some cases maintain a count and/or density of people in the building space, and/or any other suitable sensor as desired. People are known to produce contaminates in the building space.

The illustrative HVAC control system 10 also includes one or more sensors 28 that are disposed outside of the building space 12 in order to provide signals representing one or more exterior environmental conditions to the input 20. At least some of the sensors 28 may be hard-wired to the input 20. At least some of the sensors 28 may be wirelessly coupled to the input 20. In some cases, the sensors 28 are accessed from a weather service via a suitable Application Programming Interface (API). These are just examples. The sensors 28 may include temperature sensors, humidity sensors, $CO_2$ sensors and sensors configured to detect other pollutants such as particulate matter (PM), volatile organic compounds (VOCs) and the like.

In some instances, the controller 14 may communicate with a remote server 30. The remote server 30 may be a cloud-based server, for example. An edge controller 32 may provide a go-between between the controller 14 and the remote server 30. The controller 14 may provide data to the remote server 30 for performance monitoring, for example. As discussed thus far, the processor 22 within the controller 14 receives various inputs from the interior sensors 26 and the exterior sensors 28, and may receive various inputs such as HVAC operational conditions from the HVAC system 16. The processor 22 may use these various inputs to learn an environmental model for the building space 12, sometimes using Artificial Intelligence and/or Machine Learning. In other cases, the processor 22 may simply receive the various inputs from the input 20 and forward the information to the output 24 for transmission to either the edge controller 32 itself or ultimately the remote server 30 for processing. In some cases, the processing power that monitors the various inputs and creates and maintains the learned environmental model for the building space 12 may reside within the edge controller 32. In such cases, the edge controller 32 may include one or more containers in which the processing power is manifested. In some cases, the edge controller 32 merely functions as a gateway, providing the information to the remote server 30, where the processing power that monitors the various inputs and creates and maintains the learned environmental model for the building space 12 resides. In some cases, the processing power that monitors the various inputs and creates and maintains the learned environmental model for the building space 12 is distributed throughout the HVAC control system 10, the edge controller 32 and/or the remote server 30. These are just examples.

In some cases, the learned environmental model is not static, but is repeatedly updated to account for changes in the HVAC control system 10. These changes can include normal changes resulting from components of the HVAC control system 10 aging. An example is a filter that allows a decreasing air flow as the filter becomes clogged. Another example may be a variation in fan speed caused by a belt that drives the fan stretching as it ages. Heat exchangers can lose efficiency over time. The building space 12 itself may change over time. For example, windows may start to leak additional air as weather stripping on the windows ages and contracts. Alternatively, window efficiency may increase if old windows are replaced. HVAC system efficiency may increase when particular parts of the HVAC system are replaced. These are just examples of situations in which the learned environmental model is updated to account for changes in the environment.

Figure 2:
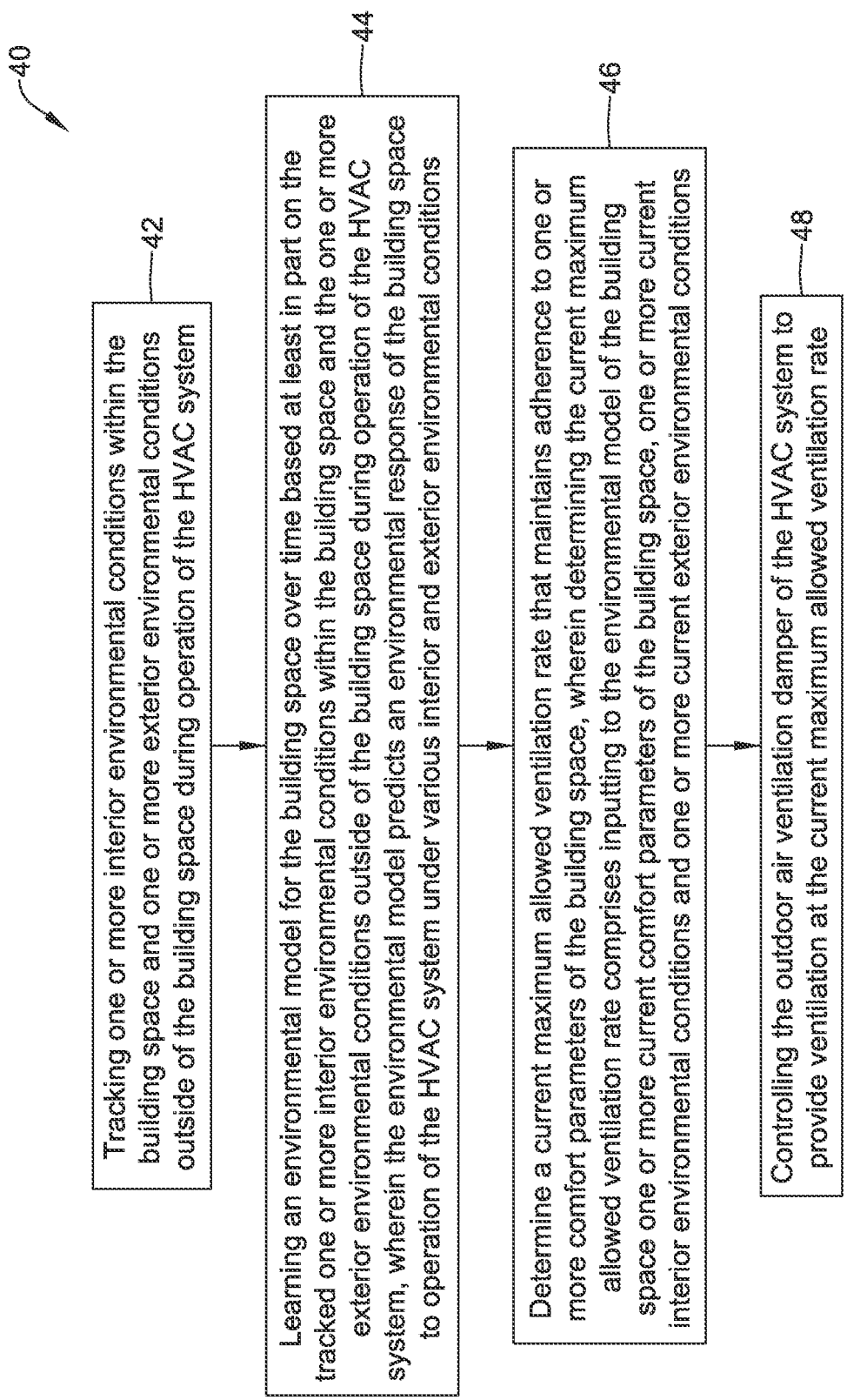
FIG. 2 is a flow diagram showing an illustrative method of providing a maximum allowed ventilation for a building space.

FIG. 2 is a flow diagram showing an illustrative method 40 for providing a maximum allowed ventilation rate for a building space (such as the building space 12) while not compromising on one or more comfort conditions in the building space using a Heating, Ventilating and/or Air Conditioning (HVAC) system that includes an outdoor air ventilation damper (such as the HVAC system 16) of the building space. The illustrative method 40 includes tracking one or more interior environmental conditions within the building space and one or more exterior environmental conditions outside of the building space during operation of the HVAC system, as indicated at block 42. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy such as a people count and/or a people density in the building. The one or more exterior environmental conditions may include outdoor air temperature. The one or more exterior environmental conditions may include outdoor humidity. The one or more exterior environmental conditions may include one or more outdoor pollutants. These are just examples.

An environmental model for the building space is learned over time based at least in part on the tracked one or more interior environmental conditions within the building space and the one or more exterior environmental conditions outside of the building space during operation of the HVAC system, as indicated at block 44. In some cases, the environmental model is learned using Artificial Intelligence and/or Machine Learning. The learned environmental model is configured to an environmental state of the building space in response to operation of the HVAC system under various interior and exterior environmental conditions. A current maximum allowed ventilation rate that can be achieved without causing the HVAC system to compromise on any of the one or more comfort conditions of the building space as indicated at block 46. In some cases, determining the current maximum allowed ventilation rate includes inputting to the learned environmental model of the building space one or more current comfort parameters of the building space, one or more current interior environmental conditions and one or more current exterior environmental conditions. In some cases, determining the current maximum allowed ventilation rate may include inputting to the learned environmental model one or more of a temperature setpoint schedule, a current humidity setpoint, a current temperature within the building space, a current fan status of a fan of the HVAC system, a current valve status of a valve of the HVAC system, and/or a current load on the HVAC system. These are just examples. The outdoor air ventilation damper 18 of the HVAC system 16 is then controlled to provide ventilation up to and/or at the current maximum allowed ventilation rate, as indicated at block 48.

In some cases, the learned environmental model may be configured to predict a current heating capacity of the HVAC system, a current cooling capacity of the HVAC system, a load on the HVAC system, and/or any other suitable parameters. These parameters may be considered intermediate parameters that are used when determining the current maximum allowed ventilation rate.

Figure 3:
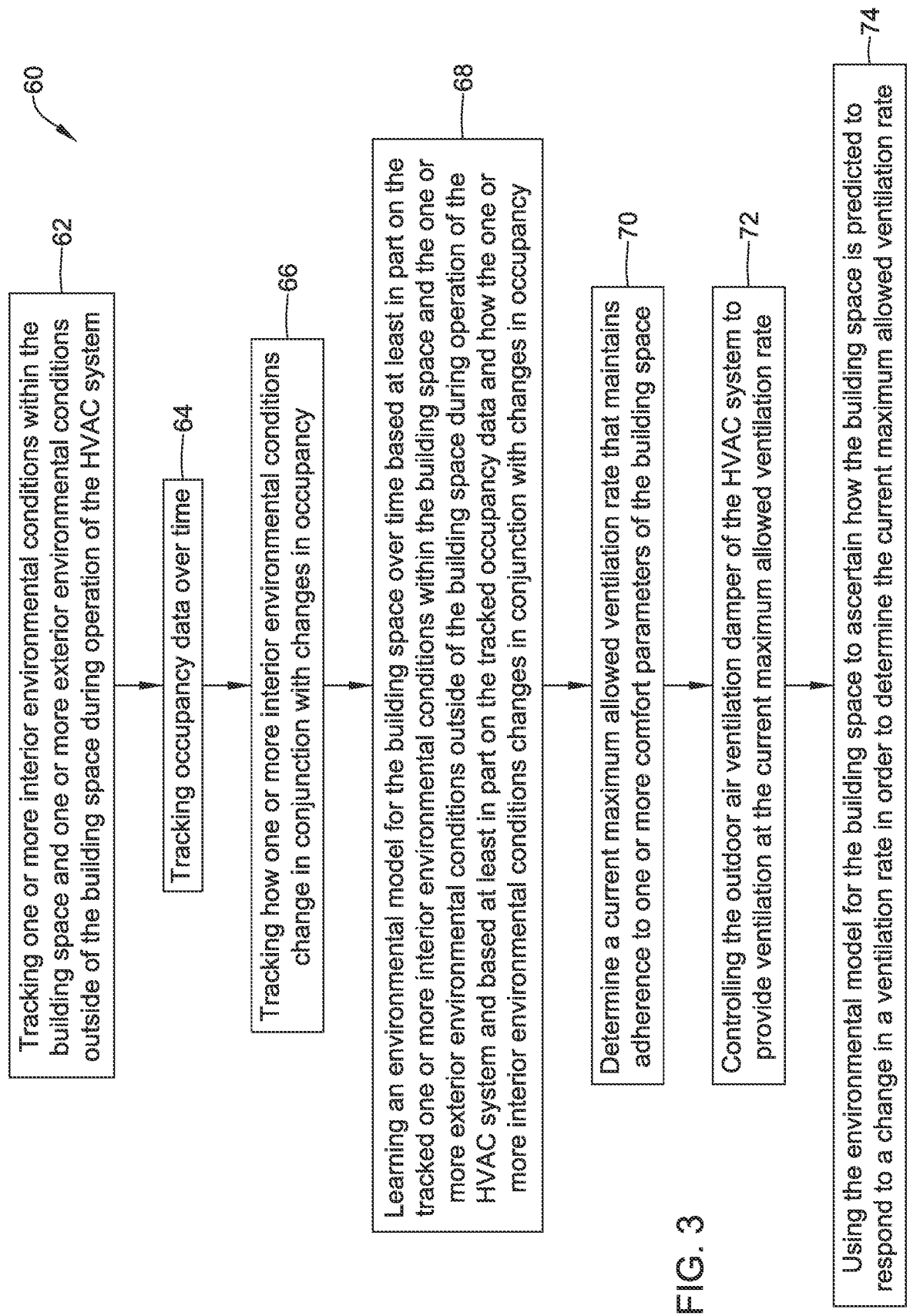
FIG. 3 is a flow diagram showing an illustrative method of providing a maximum allowed ventilation for a building space.

FIG. 3 is a flow diagram showing an illustrative method 60 for providing a maximum allowed ventilation rate for a building space (such as the building space 12) while maintaining adherence to comfort parameters during a proscribed period of time using a Heating, Ventilating and/or Air Conditioning (HVAC) system (such as the HVAC system 16) of the building space. The illustrative method 60 includes tracking one or more interior environmental conditions within the building space and one or more exterior environmental conditions outside of the building space during operation of the HVAC system, as indicated at block 62. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy such as a people count and/or people density in the building. The one or more exterior environmental conditions may include outdoor air temperature. The one or more exterior environmental conditions may include outdoor humidity. The one or more exterior environmental conditions may include one or more outdoor pollutants. These are just examples.

In some cases, occupancy data may be tracked over time, as indicated at block 64. Tracking occupancy data over time may include using video analytics to analyze one or more video streams in order to ascertain occupancy. The video streams can come from security cameras, for example. Tracking occupancy data over time may include using sensors to detect occupancy within a zone of the building space. In some instances, tracking occupancy data over time may include using sensors to detect individuals entering a zone of the building space and to detect individuals exiting a zone of the building space. For example, a time of flight (e.g. LIDAR) sensor may be used to detect and maintain a count of people in the zone of the building space. From the people count, and using the size of zone, a measure of people density for the zone can be estimated. Likewise, a millimeter wave sensor (e.g. Radar) may be used to detect and maintain a count of people in the zone of the building space. These are just examples. People are known to produce contaminates in the building space.

How one or more interior environmental conditions change in conjunction with changes in occupancy may be tracked, as indicated at block 66. For example, temperature, humidity, CO2, PM, VOCs and/or other parameters may be tracked. An environmental model for the building space is learned over time based at least in part on the tracked one or more interior environmental conditions within the building space and the one or more exterior environmental conditions outside of the building space during operation of the HVAC system under various conditions, as well as based at least in part on the tracked occupancy data and how the one or more interior environmental conditions changes in conjunction with changes in occupancy, as indicated at block 68.

The learned environmental model is configured to predict an environmental state of the building space in response to operation of the HVAC system under various interior and exterior environmental conditions. A current maximum allowed ventilation rate that can be achieved without causing the HVAC system to compromise on any of the one or more comfort conditions of the building space as indicated at block 70. This may include inputting to the learned environmental model of the building space one or more current comfort parameters associated with the one or more comfort conditions of the building space, one or more current interior environmental conditions (sometimes including current occupancy) and one or more current exterior environmental conditions. In some cases, determining the current maximum allowed ventilation rate may include inputting to the learned environmental model one or more of a temperature setpoint schedule, a current temperature within the building space and a current building space occupancy. The outdoor air ventilation damper of the HVAC system is then controlled to provide ventilation up to or at the current maximum allowed ventilation rate, as indicated at block 72. In some cases, and as indicated at block 74, the learned environmental model may be used to ascertain how the building space is predicted to respond to a change in the ventilation rate in order to determine the current maximum allowed ventilation rate.

Figure 4:
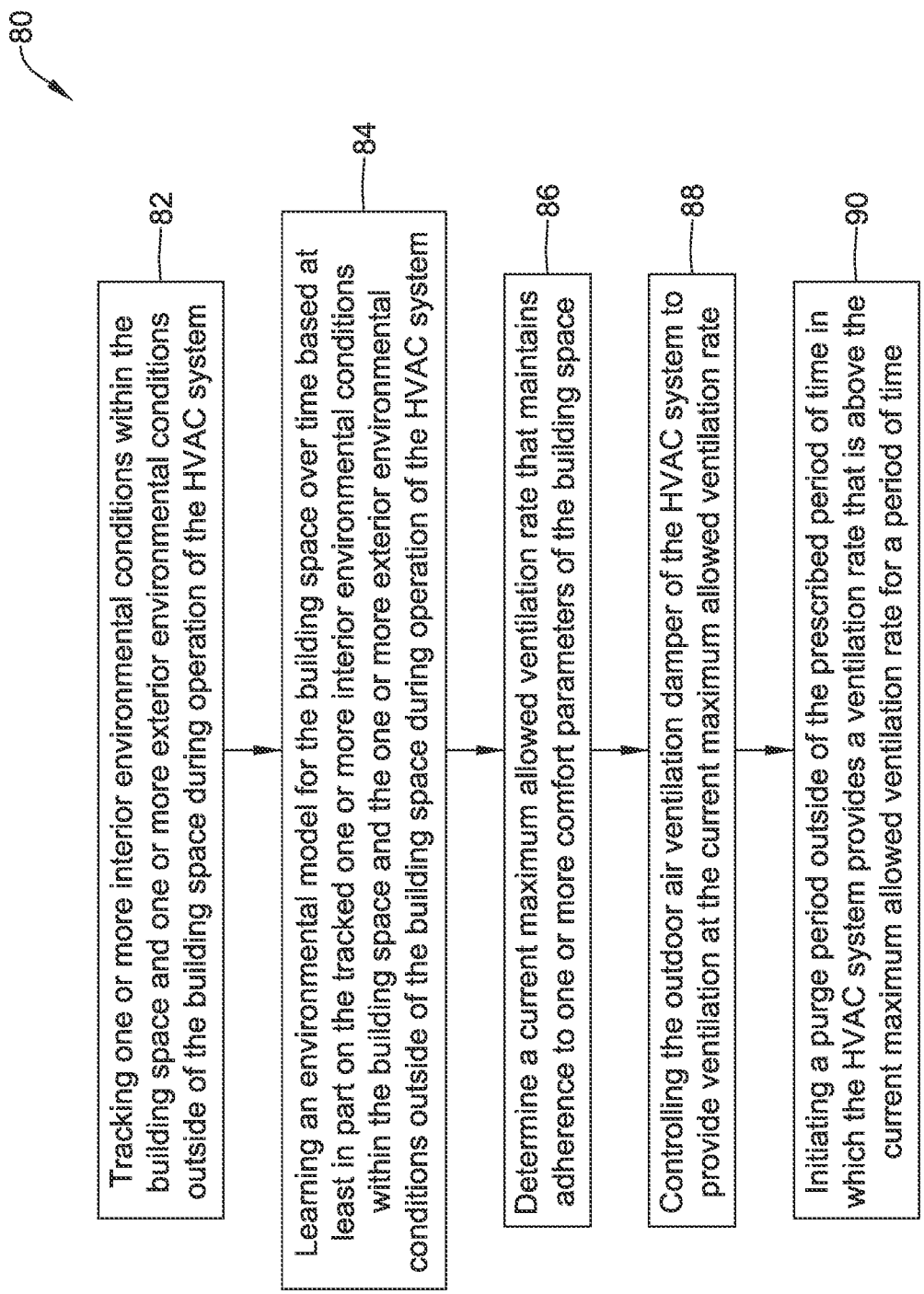
FIG. 4 is a flow diagram showing an illustrative method of providing a maximum allowed ventilation for a building space.

FIG. 4 is a flow diagram showing an illustrative method 80 for providing a maximum allowed ventilation rate for a building space (such as the building space 12) while not compromising on one or more comfort conditions in the building space using a Heating, Ventilating and/or Air Conditioning (HVAC) system that includes an outdoor air ventilation damper (such as the HVAC system 16) of the building space. The illustrative method 80 includes tracking one or more interior environmental conditions within the building space and one or more exterior environmental conditions outside of the building space during operation of the HVAC system, as indicated at block 82. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy and/a people count in the building. The one or more exterior environmental conditions may include outdoor air temperature. The one or more exterior environmental conditions may include outdoor humidity. The one or more exterior environmental conditions may include one or more outdoor pollutants. These are just examples.

An environmental model for the building space is learned over time based at least in part on the tracked one or more interior environmental conditions within the building space and the one or more exterior environmental conditions outside of the building space during operation of the HVAC system, as indicated at block 84. A current maximum allowed ventilation rate that allows adherence to one or more comfort parameters of the building space is determined as indicated at block 86. This may include inputting to the environmental model of the building space one or more current comfort parameters associated with the one or more comfort conditions of the building space, one or more current interior environmental conditions and one or more current exterior environmental conditions. In some cases, determining the current maximum allowed ventilation rate may include inputting to the environmental model one or more of a temperature setpoint schedule, a current temperature within the building space and a current building space occupancy. In some cases, the learned environmental model may be configured to predict a current heating capacity of the HVAC system, a current cooling capacity of the HVAC system, a load on the HVAC system, and/or any other suitable parameters. These parameters may be considered intermediate parameters that are used when determining the current maximum allowed ventilation rate. The outdoor air ventilation damper of the HVAC system is then controlled to provide ventilation at the current maximum allowed ventilation rate, as indicated at block 88.

In some instances, as indicated at block 90, the method 80 may include initiating a purge period in which the HVAC system provides a ventilation rate that is above the current maximum allowed ventilation rate for a period of time. In some cases, the purge period may provide a complete or a substantially complete air replacement within the building space. In some cases, the HVAC system is allowed to compromise on one or more of the one or more comfort conditions of the building space during at least part of the purge period. For example, the HVAC system may not condition incoming fresh air during at least part of the purge period. In some cases, the purge period may end at a time prior to a start of a proscribed period of time sufficient to permit the HVAC system to condition the building space and reach a comfort setting prior to the start of the proscribed period of time. In some cases, such as in an office building, the purge period is performed at night when occupancy is not expected. In a movie theater, the purge period may be performed between shows. These are just examples.

Figure 5:
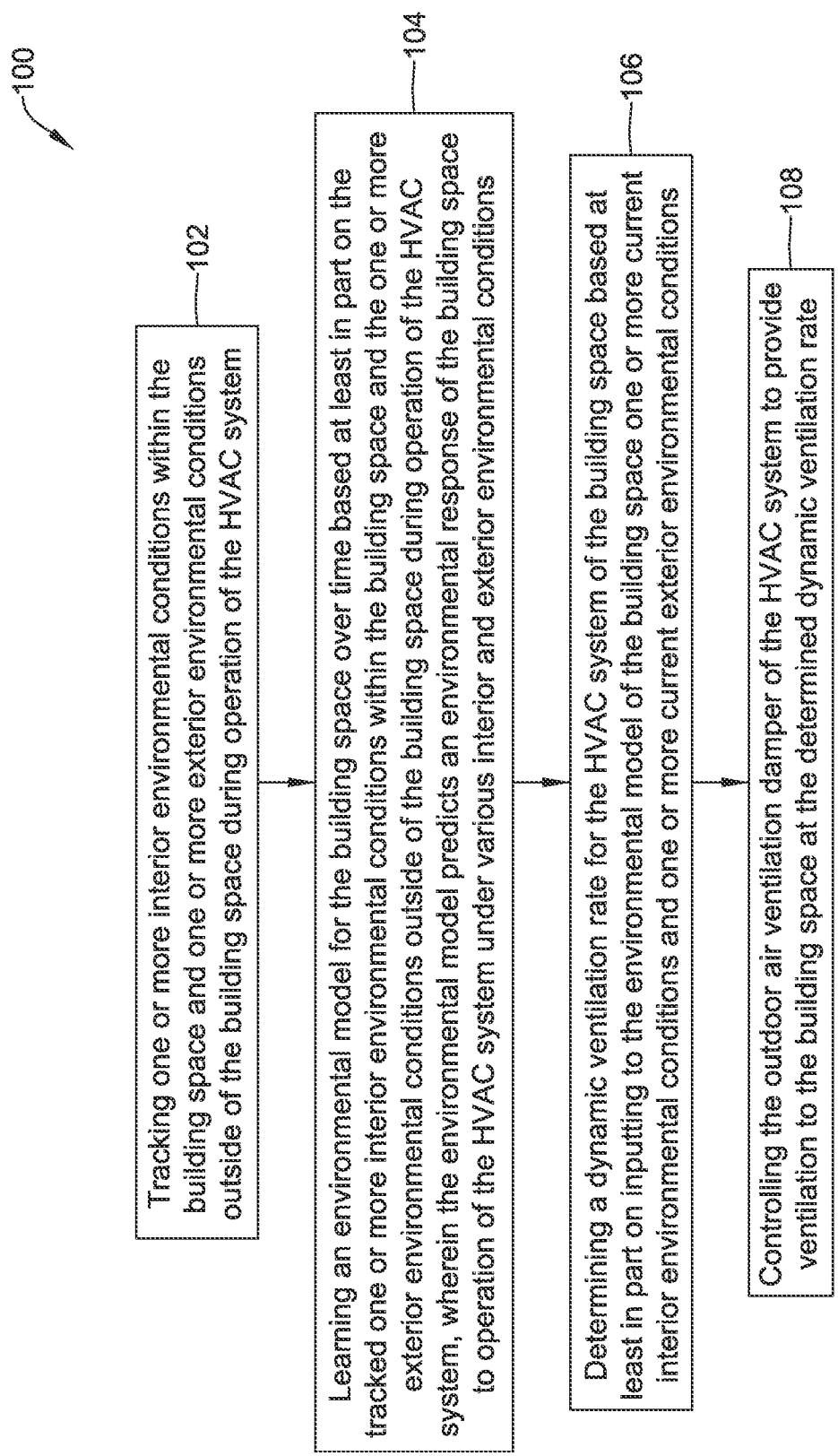
FIG. 5 is a flow diagram showing an illustrative method of providing a dynamic ventilation rate for a building space.

FIG. 5 is a flow diagram showing an illustrative method 100 for providing a dynamic ventilation rate for a building space using a Heating, Ventilating and/or Air Conditioning (HVAC) system. The illustrative method 100 includes tracking over time one or more interior environmental conditions within the building space and one or more exterior environmental conditions outside of the building space during operation of the HVAC system, as indicated at block 102. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy and/a people count in the building. The one or more exterior environmental conditions may include outdoor air temperature. The one or more exterior environmental conditions may include outdoor humidity. The one or more exterior environmental conditions may include one or more outdoor pollutants. These are just examples.

An environmental model for the building space is learned over time based at least in part on the tracked one or more interior environmental conditions within the building space and the one or more exterior environmental conditions outside of the building space during operation of the HVAC system. The learned environmental model may be configured to predict an environmental state of the building space in response to operation of the HVAC system under various interior and exterior environmental conditions, as indicated at block 104. A dynamic ventilation rate for the HVAC system of the building space is determined based at least in part on inputting to the environmental model of the building space one or more current interior environmental conditions and one or more current exterior environmental conditions, as indicated at block 106. The outdoor air ventilation damper of the HVAC system is then controlled to provide ventilation to the building space at the determined dynamic ventilation rate, as indicated at block 108.

In some instances, the environmental model may predict a current heating capacity of the HVAC system. The environmental model may predict a current cooling capacity of the HVAC system. The environmental model may predict a current and/or expected load on the HVAC system. In some cases, the environmental model may predict the HVAC systems capacity to cool/heat the outdoor air given the predicted load and outside weather conditions. In some cases, a maximum ventilation parameter is determined that is representative of a rate of outside air having the one or more exterior environmental conditions that can be conditioned by the measure of current unused heating and/or cooling capacity of the HVAC system while still maintaining the one or more comfort conditions for the building space. The dynamic ventilation rate may then be based at least in part on the maximum ventilation parameter. For example, the dynamic ventilation rate may be capped at by the maximum ventilation parameter, where the maximum ventilation parameter may be representative of a maximum ventilation rate that can be achieved given the HVAC systems current capacity to cool/heat the outdoor air given the predicted load and outside weather conditions. In some cases, a certain capacity margin may be in-built into the maximum ventilation parameter.

In some cases, the tracking step (block 102), the learning step (block 104) and the determining step (block 106) may be performed at a remote location remote from the building space (e.g. at server 30 of FIG. 1), while the controlling step (block 108) may be performed by the HVAC system (e.g. HVAC system 16 of FIG. 1) of the building space. However, it is contemplated that the tracking step (block 102), the learning step (block 104) and/or the determining step (block 106) may be performed on site (e.g. by the controller 14 and/or edge controller 32 of FIG. 1). These are just examples.

Figure 6:
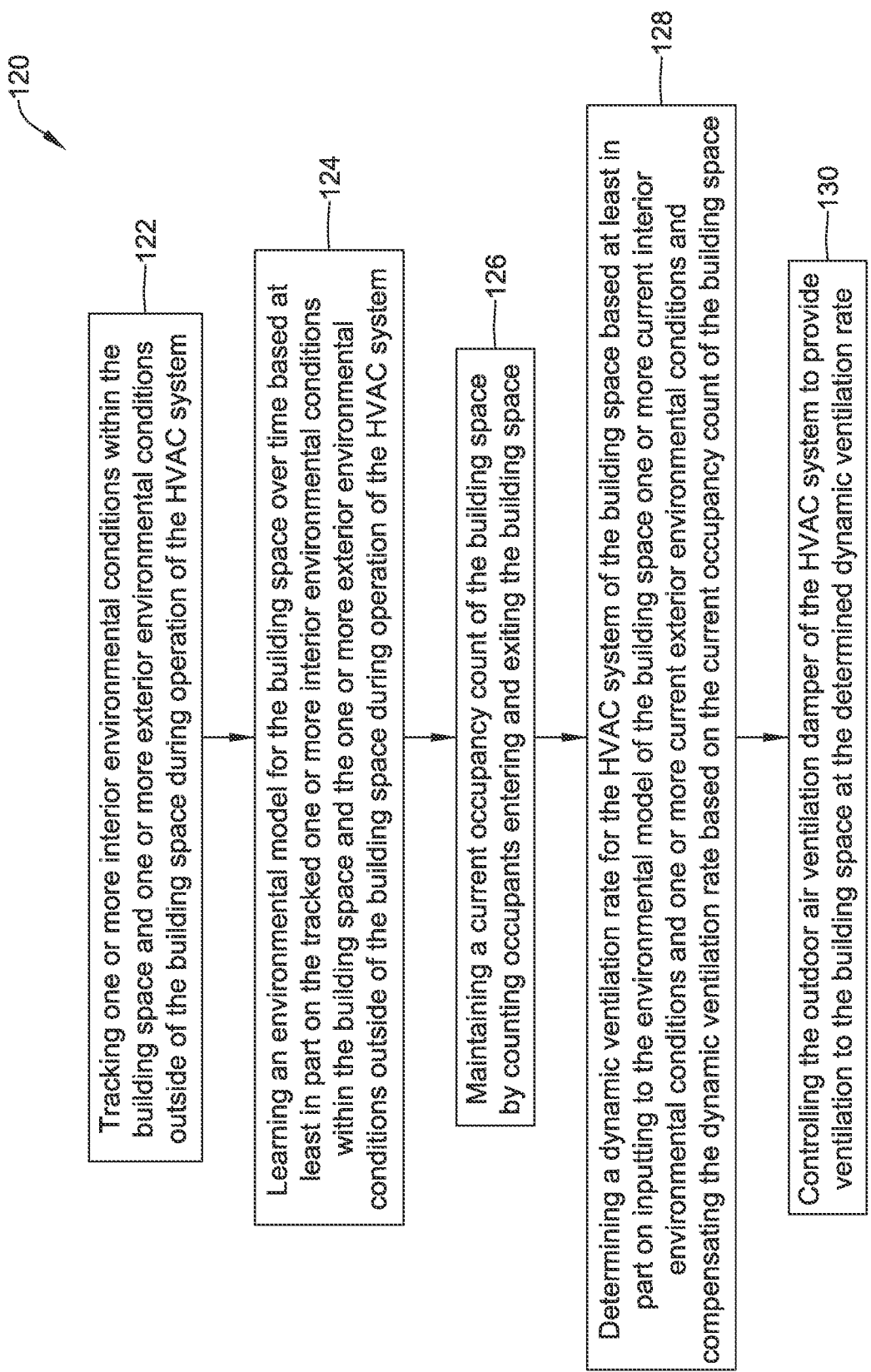
FIG. 6 is a flow diagram showing an illustrative method of providing a dynamic ventilation rate for a building space.

FIG. 6 is a flow diagram showing an illustrative method 120 for providing a dynamic ventilation rate for a building space using a Heating, Ventilating and/or Air Conditioning (HVAC) system. The illustrative method 120 includes tracking over time one or more interior environmental conditions within the building space and one or more exterior environmental conditions outside of the building space during operation of the HVAC system, as indicated at block 122. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy and/a people count in the building. The one or more exterior environmental conditions may include outdoor air temperature. The one or more exterior environmental conditions may include outdoor humidity. The one or more exterior environmental conditions may include one or more outdoor pollutants. These are just examples.

An environmental model for the building space is learned over time based at least in part on the tracked one or more interior environmental conditions within the building space and the one or more exterior environmental conditions outside of the building space during operation of the HVAC system. The environmental model may be configured to predict an environmental state of the building space in response to operation of the HVAC system under various interior and exterior environmental conditions, as indicated at block 124. In this illustrative method, a current occupancy count and/or density of the building space may be maintained by counting occupants entering and existing the building space, as indicated at block 126.

Tracking occupancy data over time may include using video analytics to analyze one or more video streams in order to ascertain occupancy. The video streams can come from security cameras, for example. Tracking occupancy data over time may include using sensors to detect occupancy within a zone of the building space. In some instances, tracking occupancy data over time may include using sensors to detect individuals entering a zone of the building space and to detect individuals exiting a zone of the building space. For example, a time of flight (e.g. LIDAR) sensor may be used to detect and maintain a count of people in the zone of the building space. Likewise, a milli-meter wave sensor (e.g. Radar) may be used to detect and maintain a count of people in the zone of the building space. These are just examples. People are known to produce contaminates in the building space.

A dynamic ventilation rate for the HVAC system of the building space is determined based at least in part on inputting to the environmental model of the building space one or more current interior environmental conditions and one or more current exterior environmental conditions. The dynamic ventilation rate may be compensated based on the current occupancy count and/or density of the building space, as indicated at block 128. The outdoor air ventilation damper of the HVAC system is then controlled to provide ventilation to the building space at the determined dynamic ventilation rate, as indicated at block 130. In some cases, the dynamic ventilation rate is capped to allow the HVAC system to not compromise on one or more comfort conditions in the building space.

Figure 7:
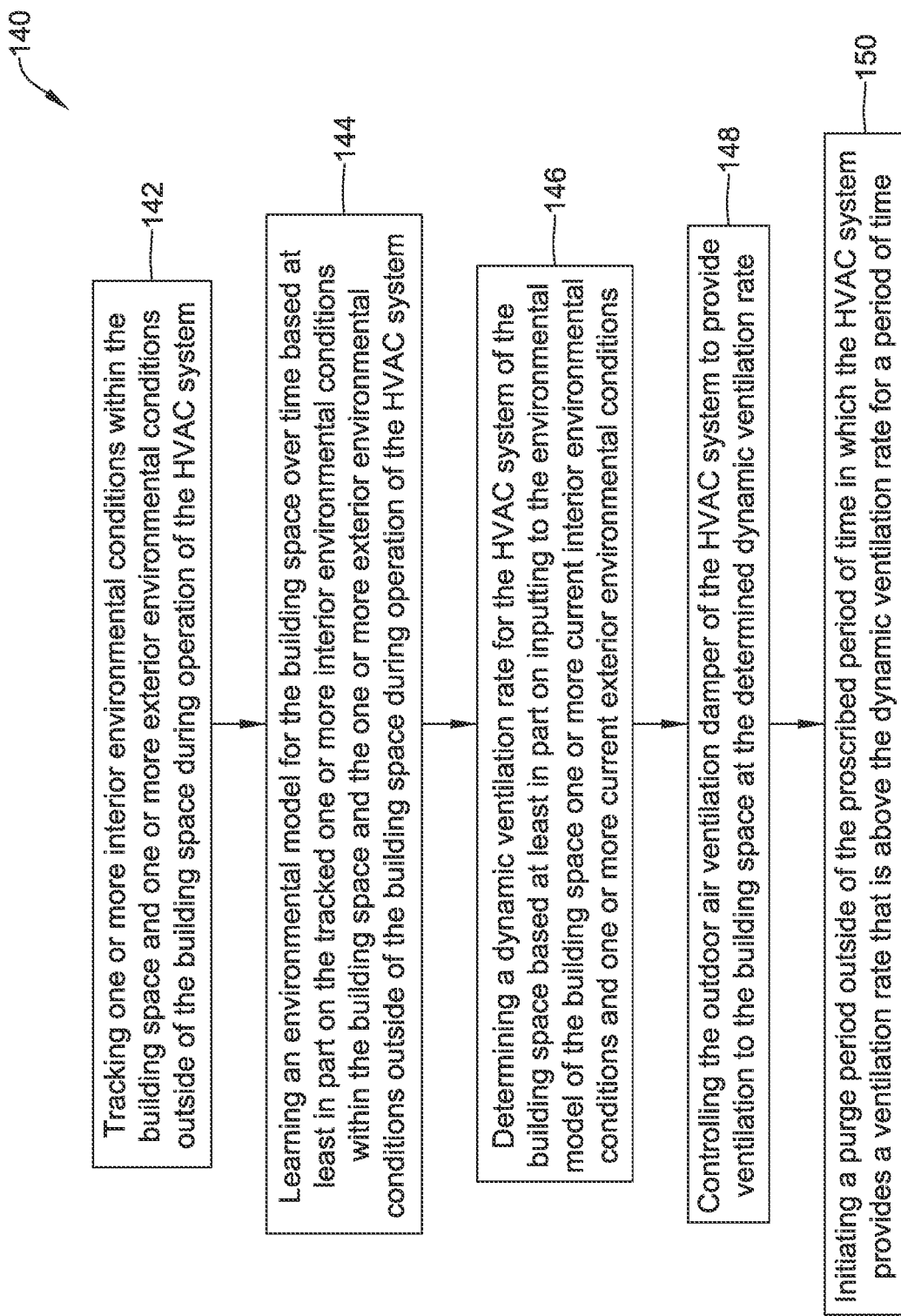
FIG. 7 is a flow diagram showing an illustrative method of providing a dynamic ventilation rate for a building space.

FIG. 7 is a flow diagram showing an illustrative method 140 for providing a dynamic ventilation rate for a building space using a Heating, Ventilating and/or Air Conditioning (HVAC) system. The illustrative method 140 includes tracking over time one or more interior environmental conditions within the building space and one or more exterior environmental conditions outside of the building space during operation of the HVAC system, as indicated at block 142. The one or more interior environmental conditions may include indoor air temperature. The one or more interior environmental conditions may include indoor humidity. The one or more interior environmental conditions may include concentrations of one or more indoor pollutants such as but not limited to $CO_2$, particular matter (PM 2.5 and PM 10) and volatile organic compounds (VOCs). The one or more interior environmental conditions may include occupancy and/a people count in the building. The one or more exterior environmental conditions may include outdoor air temperature. The one or more exterior environmental conditions may include outdoor humidity. The one or more exterior environmental conditions may include one or more outdoor pollutants, for example.

An environmental model for the building space is learned over time based at least in part on the tracked one or more interior environmental conditions within the building space and the one or more exterior environmental conditions outside of the building space during operation of the HVAC system. The environmental model is configured to predict an environmental state of the building space in response to operation of the HVAC system under various interior and exterior environmental conditions, as indicated at block 144.

A dynamic ventilation rate for the HVAC system of the building space is determined based at least in part on inputting to the environmental model of the building space one or more current interior environmental conditions and one or more current exterior environmental conditions, as indicated at block 146. The outdoor air ventilation damper of the HVAC system is then controlled to provide ventilation to the building space at the determined dynamic ventilation rate, as indicated at block 148.

In some instances, as indicated at block 150, the method 140 may include initiating a purge period outside of a proscribed period of time in which the HVAC system provides a ventilation rate that is above the dynamic ventilation rate for a period of time. In some cases, the purge period may provide a complete or a substantially complete air replacement within the building space. In some cases, the HVAC system is allowed to compromise on one or more of the one or more comfort conditions of the building space during at least part of the purge period. For example, the HVAC system may not condition incoming fresh air during at least part of the purge period. In some cases, the purge period may end at a time prior to a start of a proscribed period of time sufficient to permit the HVAC system to condition the building space and reach a comfort setting prior to the start of the proscribed period of time. In some cases, such as in an office building, the purge period is performed at night when occupancy is not expected. In a movie theater, the purge period may be performed between shows. These are just examples.

Figure 8:
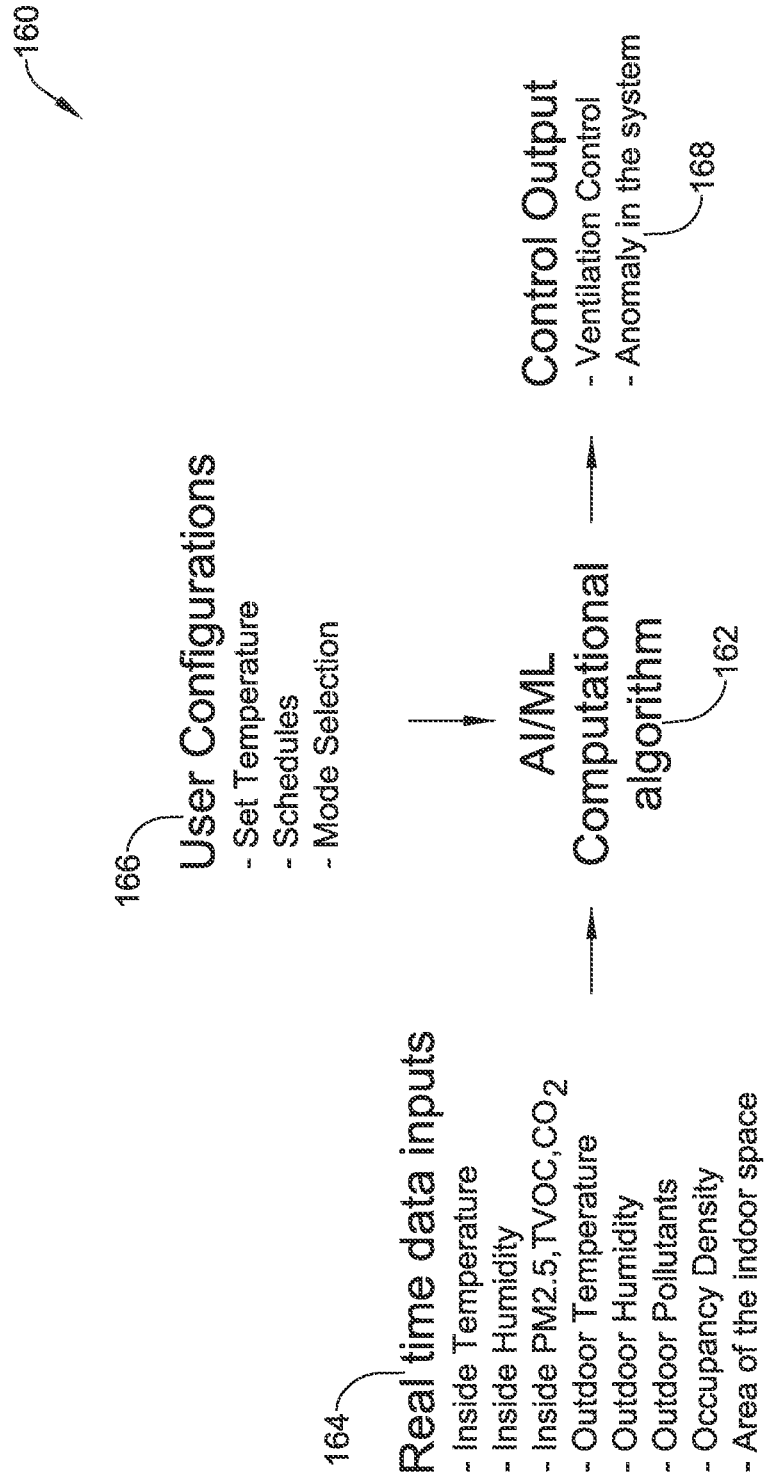
FIG. 8 is a schematic block diagram showing an illustrative HVAC control system.

FIG. 8 is a schematic block diagram showing an illustrative HVAC ventilation control system 160. The ventilation control system 160 includes an illustrative computational algorithm 162 that receives a number of real or near-real time data inputs 164 and a number of user configurations 166 and provides a control output 168. In this example, the real time data inputs 164 include one or more of inside temperature, inside humidity, inside PM2.5 (particulate matter), TVOC (total volatile organic compounds), outdoor temperature, outdoor humidity, outdoor pollutants, occupancy density and the area of a particular indoor space. The user configurations 166 include one or more of temperature setpoints, schedules and mode selection. The mode selection may be selected from, for example, a pandemic mode calling for a maximum allowed ventilation rate while not compromising on one or more comfort conditions in the building space (e.g. still maintaining adherence to comfort parameters), and a normal operating mode calling for a minimum ventilation rate while still adequately ventilating the building given the current contaminates or expected contaminates in the building.

In this example, the control output 168 can include not only ventilation control, but in some instances can identify anomalies in the HVAC system. An anomaly may be detected when the HVAC system behaves in a manner that is different or even substantially different from what is expected. The control output 168 may include a message to a user alerting the user of the anomaly and may include one or more possible causes for the anomaly. An example of an anomaly would be expecting a current temperature to be reached at a given time, but discovering that the actual current temperature has not reached by the expected temperature. Possible causes could be a cooling valve malfunction or a heating valve malfunction. A belt driving a fan may have stretched or even broken. These are just examples. Based on the nature of the anomaly, the model may indicate one or more possible root causes for the user to investigate.

Figure 9:
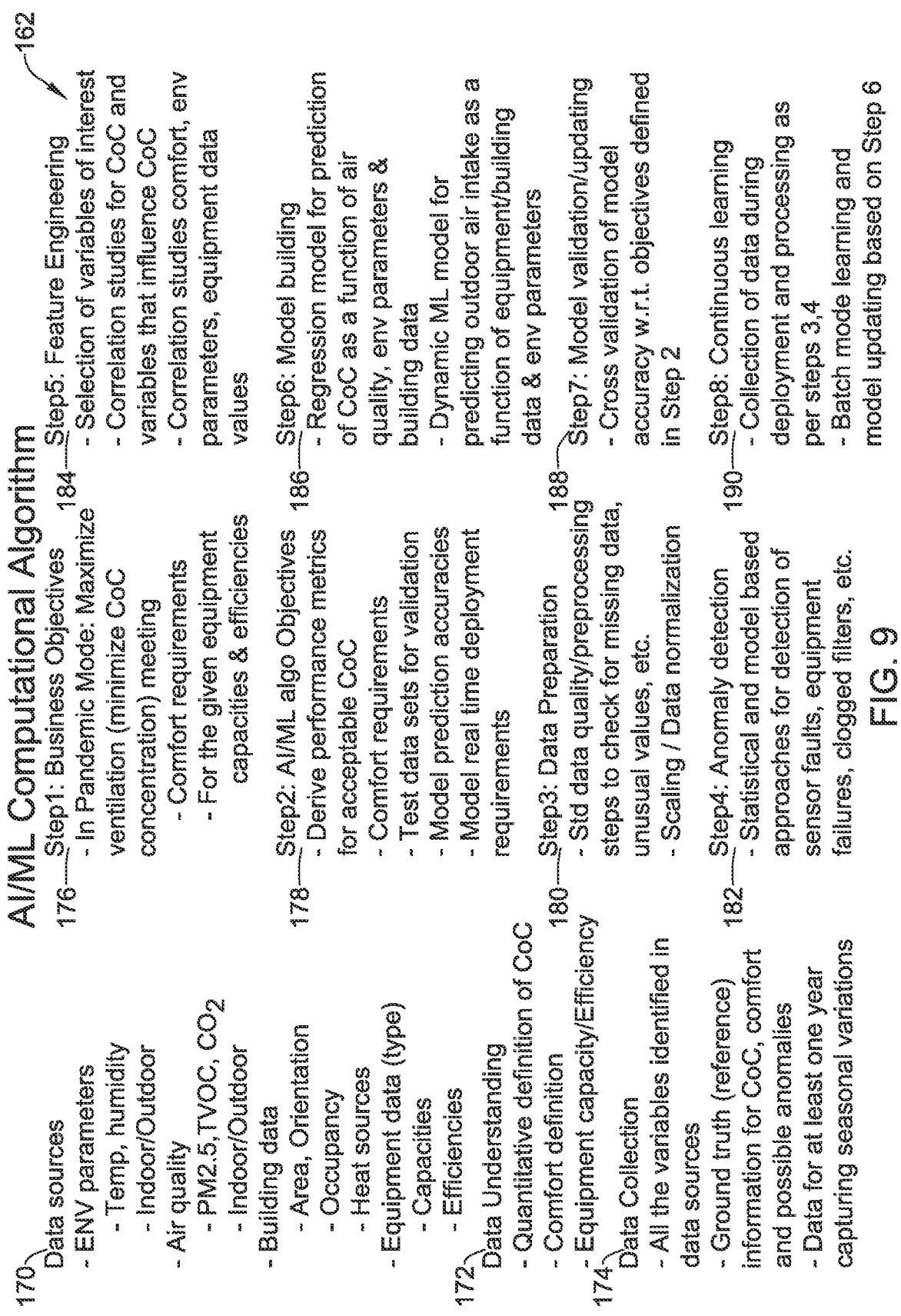
FIG. 9 is a schematic block diagram of an illustrative algorithm forming part of the illustrative HVAC control system of FIG. 8.

The illustrative computational algorithm 162 may be used in part to create, edit or update the environmental model. Accordingly, the illustrative computational algorithm 162 may have a variety of inputs such as but not limited to one or more interior environmental conditions within the building space and one or more exterior environmental conditions outside of the building space during operation of the HVAC system. Block 170 of FIG. 9 provides additional examples of possible data sources. Data sources may include environmental parameters, air quality values, building data and equipment type data. Block 172 of FIG. 9 provides for the algorithm understanding the data. This may include a quantitative definition of Contaminants of Concern (CoC) as well as a definition of comfort standards. Data understanding may also include understanding the capacity and efficiency of the HVAC equipment, for example. Block 174 of FIG. 9 pertains to data collection. Data collection may include all of the sources listed in the block 170. Data collection may include ground truth (reference) information for CoC, comfort and possible anomalies. In some cases, data collection may span a period of at least one year, in order to capture seasonal variations.

The illustrative computational algorithm 162 has a Step One, as indicated at block 176 of FIG. 9. In Step One, the illustrative computational algorithm 162, particularly when in pandemic mode, has a goal of maximizing ventilation (or minimizing CoC concentration in the building) while meeting comfort requirements and staying within the capabilities and efficiencies of the HVAC system. In some cases, the illustrative computational algorithm 162 may have a goal, particularly when not in pandemic mode, of providing an appropriate dynamic ventilation rate such as to minimize the ventilation rate while still adequately ventilating the building given the current contaminates or expected contaminates in the building. Step Two, indicated at block 178, has objectives that include deriving performance metrics for acceptable CoC values. Step Two includes paying attention to comfort requirements, test data sets for validation, model prediction accuracies and model real time deployment requirements.

The illustrative computational algorithm 162 has a Step Three, as indicated at block 180. Step Three involves data preparation. This may include data quality or pre-processing steps in order to check for missing data, unusual or unexpected values, and the like. A Step Four, as indicated at block 182, involves anomaly detection. For example, statistical and/or model-based approaches may be used to detect sensor faults, equipment failures, clogged filters and the like. Step Five, indicated at block 184 of FIG. 9, includes feature engineering. This may include selecting variables of interest. This may include correlation studies for CoC and variables that can or have been found to influence CoC values. This may include correlation studies for comfort and various environmental parameters and equipment data values.

The illustrative computational algorithm 162 has a Step Six, as indicated at block 186. Step Six involves model building. Model building may, for example, include one or more regression models that aim to predict CoC as a function of air quality, environmental parameters and building data. Model building may include a dynamic ML (machine learning) model that aims to predict appropriate outdoor air intake into the building as a function of equipment data, building data and environmental parameters. Step Seven, indicated at block 188, pertains to model validation. This may include cross-validation of model accuracy with respect to the objectives defined in Step Two (block 178). Step Eight, indicated at block 190, pertains to continuous learning by the illustrative computational algorithm 162. Data may be collected during deployment and processing, as indicated at Step Three (block 180) and Step Four (block 182). Batch mode learning and model updating based on Step Six (block 186) may also occur. The illustrative computational algorithm 162 may reside within the controller 14, the edge controller 32 and/or the cloud-based server 30, for example.

In some cases, the HVAC system 16 (FIG. 1) may be operated in accordance with a selected mode out of a plurality of modes. For example, the HVAC system 16 may be operated in accordance with a Health mode, which prioritizes providing as much fresh air as is feasible to maximize air quality parameters while maintaining comfort in the building space. The Health mode may be selected during a pandemic, for example. In some cases, the ventilation protocols described herein with respect to FIGS. 2 through 9 may be considered as being applicable to a Health mode. As another example, the HVAC system 16 may be operated in accordance with an Energy mode, which prioritizes minimizing energy costs for running the HVAC system while maintaining comfort and air quality parameters. As another example, the HVAC system 16 may be operated in accordance with a Productivity mode, which prioritizes minimizing energy while reaching higher air quality limits than those required by the Energy mode, as it has been found that reaching particular air quality limits above those required for safety of building occupants can generate improvement in employee productivity. These are just examples of contemplated ventilation modes.

When in the Health mode, a goal may be to maximize outdoor air intake without compromising thermal comfort requirements within the building space 12, or within a zone within the building space 12. It will be appreciated that various constraints may be taken into account, including but not limited to HVAC equipment capacity, zone-wise occupancy levels, outdoor temperature and/or other considerations. In some cases, it may not be beneficial to bring in more outdoor air because occupant comfort may suffer and/or it energy costs associated with operating the HVAC system may substantially increase with little benefit. In other cases, when the outdoor air is at a temperature and/or humidity that requires little or no conditioning, it may be beneficial to bringing in more outdoor air to help meet temperature and other indoor comfort conditions.

In some cases, when in Health mode, zone level indoor air quality is not directly constrained with respect to $CO_2$ concentration, PM2.5 concentration and TVOC (total volatile organic compound) concentration. Rather, it is understood that these concentrations will naturally drop below IAQ limits simply by bringing in sufficient fresh air from outdoors. Of course, if the outdoor air is particularly polluted on a particular day or time of day, this may impact how much fresh air should be brought in.

In order to optimize ventilation and other features of operating the HVAC system 16, there is a goal of minimizing a cost function that ties together the competing interests in operating the HVAC system 16. In the Health mode, there is a desire for as much fresh air as possible while still maintaining comfort requirements and minimizing energy consumption, all at the same time. The illustrative cost function includes terms for each of a variety of competing requirements. For example, there is a cost function term for air flow rate, including being able to maximize airflow into a particular AHU (air handling unit) as well as being able to maximize airflow into a particular zone. There is a cost function term for temperature, that only penalizes the cost function when zone temperature constraints are not met. In some cases, the cost function term for temperature involves slack variables. There is a cost function term for energy, that only penalizes the cost function once the AHU has met maximum airflow requirements. In some cases, the cost function term for temperature and the cost function term for energy are weighted, and the problem can be formulated in two different ways, based on how the cost function term for energy is weighted in the optimization function.

An illustrative cost function for a Formulation 1 of the Health mode is given below:

$$J = \text{Min}\left[\sum_{k=0}^{N-1}(\bar{x}_k^f - x_k^f) + \sum_{k=0}^{N-1}\sum_{i=1}^{N_z}\left(\frac{Occ_i}{\overline{Occ_i}}\right)\left(\frac{\bar{x}_{i,k}^f - x_{i,k}^f}{\bar{x}_{i,k}^f}\right) - \right.$$
$$\left.(1-h(\bar{x}_k^f))\sum_{k=0}^{N_c-1}\|R_k l(d_k)\|_1 + \sum_{k=0}^{N-1}\sum_{k=0}^{N_z}\|Q_k f(z_{k,i})\|_2^2\right]$$

where:

$$\sum_{k=0}^{N-1}(\bar{x}_k^f - x_k^f)$$

This term represents the airflow rate at the AHU level;

$$\sum_{k=0}^{N-1}\sum_{i=1}^{N_z}\left(\frac{Occ_i}{\overline{Occ_i}}\right)\left(\frac{\bar{x}_{i,k}^f - x_{i,k}^f}{\bar{x}_{i,k}^f}\right)$$

This term represents the air flowrate at the zone level and normalizes the airflow rate;

$$\Sigma_{k=0}^{N_c-1}\|R_k l(d_k)\|_1$$

This term represents the cost associated with energy expenditure;

$$\Sigma_{k=0}^{N-1}\Sigma_{k=0}^{N_z}\|Q_k f(z_{k,i})\|_2^2$$

Figure 10:
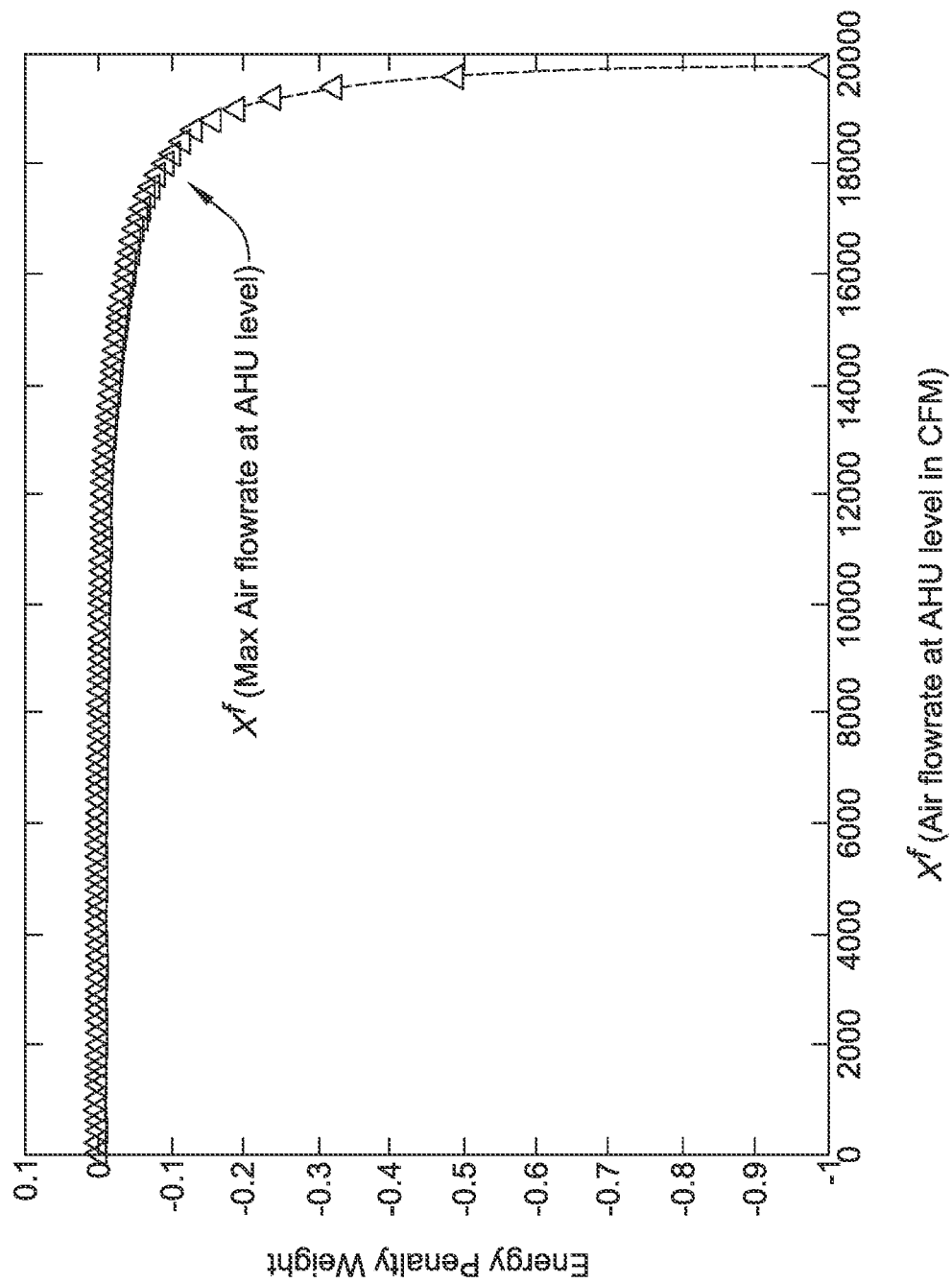
FIG. 10 is a graph showing an example of energy penalty weighting relative to air flow rate.

This term represents the cost associated with thermal comfort violations; and $(1-h(\bar{x}_k^f))$ is a weighting term that gives a transition from a low weight at the start to a high value on satisfying a threshold. This is illustrated in FIG. 10, which is a graph showing energy penalty weight (ranging from 0 to −1) versus air flow rate. As can be seen, the energy penalty weight remains at or close to zero until the air flow rate approaches a maximum air flow rate.

In particular:

$(\bar{x}_k^f - x_k^f)$ denotes the differential air flow rate with respect to the maximum airflow rate given by $\bar{x}_k^f$;

$(\bar{x}_{i,k}^f - x_{i,k}^f)$ denotes the differential air flow rate in zone "i" with respect to the maximum design flowrate for the zone given by $\bar{x}_{i,k}^f$;

$x_{i,k}^f$ is a function of actuator manipulations ($a_k$) and the setpoints ($r_k$); the decision variables ($d_k$) include $a_k$ and $r_k$;

$l(d_k)$ denotes the energy consumed as a function of the setpoint $r_k$ and the actuator movement $a_k$.

It will be appreciated that the illustrative cost function of Formulation 1 of the Health mode is subject to a number of constraints listed below:

Constraints (s.t.)
x(k+1)=Ax(k)+Bu(k)+Ww(k) (System dynamics)
x(0)=$x_0$ (Initial state estimate: y→[obsrver]→x)
$Gd_k \le g$ (Constraint on the decision variables)
$H\Delta d_k \le h$ (Constraints on the rate change of decision variables)
where, $d_k=[r_k, a_k]$ $$h(x^f) = \frac{\bar{x}_k^f - 0.99 x_k^f}{\bar{x}_k^f - x_k^f}$$

(observed states at each iteration should always satisfy:)
$\underline{x}_{k,i}^T - z_{k,i} \le x_{k,i}^T \le \bar{x}_{k,i}^T + z_{k,i}$
$0 \le z_{k,i} \le \bar{z}_{k,i}$
where, $i \in [N_z]$ In one example, the energy consumed at a heating coil of the HVAC system depends on the heat flows or the temperature gradient. This effect is caused as a result of heating valve movement, for example. The functional relationships among the variables are established as part of an energy model, which is based on system dynamics.

It will be appreciated that $f(z_k)$ is a function of the slack variable $z_k$ and is used to capture the cost related to thermal discomfort. The formulation presented here is directed to maximizing the air flow rates at the AHU as well as at the zone level, along with minimizing energy costs and thermal discomfort.

An illustrative cost function for a Formulation 2 of the Health mode is given below:

$$J = \text{Min}\left[\sum_{k=0}^{N-1}\left(\overline{x}_k^f - x_k^f\right) + \right.$$
$$\left.\sum_{k=0}^{N-1}\sum_{i=1}^{N_z}\left(\frac{Occ_i}{\overline{Occ}_i}\right)\left(\frac{\overline{x}_{i,k}^f - x_{i,k}^f}{\overline{x}_{i,k}^f}\right) - \lambda\sum_{k=0}^{N_c-1}\|R_k l(d_k)\|_1 + \sum_{k=0}^{N-1}\sum_{k=0}^{N_z}\|Q_k f(z_{k,i})\|_2^2\right]$$

where:

$$\sum_{k=0}^{N-1}\left(\overline{x}_k^f - x_k^f\right)$$

This term is representative of the air flow rates at the AHU level;

$$\sum_{k=0}^{N-1}\sum_{i=1}^{N_z}\left(\frac{Occ_i}{\overline{Occ}_i}\right)\left(\frac{\overline{x}_{i,k}^f - x_{i,k}^f}{\overline{x}_{i,k}^f}\right)$$

This term is representative of the air flow rates at the zone level;

$$\Sigma_{k=0}^{N_c-1}\|R_k l(d_k)\|_1$$

This term is representative of the cost associated with energy expenditure;

$$\Sigma_{k=0}^{N-1}\Sigma_{k=0}^{N_z}\|Q_k f(z_{k,i})\|_2^2$$

This term is representative of the cost associated with thermal comfort violations; and $\lambda$ is a binary value that takes the value of one (1) when the fresh air flow rate at the AHU level is at maximum, and is otherwise set equal to zero (0).

It will be appreciated that the illustrative cost function of Formulation 2 of the Health mode is subject to a number of constraints listed below:

Constraints (s.t.)
$x(k+1)=Ax(k)+Bu(k)+Ww(k)$ (System dynamics)
$x(0)=x_0$ (Initial state estimate: y→[obsrver]→x)
$Gd_k \leq g$ (Constraint on the decision variables)
$H\Delta d_k \leq h$ (Constraints on the rate change of decision variables)
where, $d_k=[r_k, a_k]$
$\lambda \in \{0, 1\}$ binary
(observed states at each iteration should always satisfy:)
$\underline{x}_{k,i}^T - z_{k,i} \leq x_{k,i}^T \leq \overline{x}_{k,i}^T + z_{k,i}$
$0 \leq z_{k,i} \leq \overline{z}_{k,i}$
where, $i \in [N_z]$ For completeness, a description for the notations used in the illustrative cost functions is provided below:

Notation Description
x: state Vector, $x \in \mathbb{R}^{n_z}$
u: system input vector, $u \in \mathbb{R}^{n_u}$
y: system output vector, $y \in \mathbb{R}^{n_y}$
w: disturbance input vector, $w \in \mathbb{R}^{n_w}$
$x_0$: initial state vector, $x_0 \in \mathbb{R}^{n_x}$
$n_x$: dimension of the state vector
$n_u$: dimension of the system input vector
$n_y$: dimension of the system output vector
$n_y$: dimension of the disturbance input vector
A: state-space matrix, $A \in R^{n_x * n_x}$
B: input matrix, $B \in R^{n_z * n_z}$
W: disturbance matrix, $B \in R^{n_z * n_z}$
C: output matrix, $C \in R^{n_x * n_x}$
$T_s$: sampling time
$N_c$: control horizon in time steps, control horizon window=$N_c T_s$
N: prediction horizon in time steps, prediction horizon window=$NT_s$
$N_z$: number of zones in the multi-zone building
$[N_z]$: set $\{1, 2, \ldots, N_z\}$ Notation Description
$x_{k,i}^{IAQ}$: IAQ concentration at the $k^{th}$ instant for zone t
$z_{k,i}$: slack variable on the $i^{th}$ zone temperature at the $k^{th}$ instant
$s_{k,i}$: slack variable on the $i^{th}$ zone IAQ concentration at the $k^{th}$ instant
$\overline{z}_{k,i}$: upper bound on the slack variable z on the $i^{th}$ zone at the $k^{th}$ instant
$\overline{s}_{k,i}$: upper bound on the slack variable s on the $i^{th}$ zone at the $k^{th}$ instant
$\overline{z}_{i,k}^{IAQ,A}$: upper bound on the IAQ concentration defined as per the ASHRAE standard 62.1 & 62.2
$\overline{x}_{i,k}^{IAQ,P}$: dynamic upper bound on the IAQ concentration for zone i at the $k^{th}$ instant
$\overline{x}_{i,k}^{IAQ}$: upper bound on the IAQ concentration in zone i at the $k^{th}$ instant†
$\underline{x}_{i,k}^{IAQ}$: lower bound on the IAQ concentration in zone i at the $k^{th}$ instant‡

Notation Description
$x_{k,i}^T$: temperature for the $i^{th}$ zone at the $k^{th}$ instant
J: cost function
$\|(.)\|_1$: 1—norm of (.)
$\|(.)\|_2$: 2—norm of (.)
$f(z_{k,i})$: function defining thermal comfort violation for the $i^{th}$ zone at instant k
$h(s_{k,i})$: function defining IAQ bound violation for the $i^{th}$ zone at instant k
$R_k$: weighing matrix for the MVs
$Q_k$: weighing matrix for the thermal comfort violation
$P_k$: weighing matrix for the $CO_2$ constraint violation
g: constraints on the decision variables, $g \in \mathbb{R}^{n_x}$
h: constraints on the rate change of decision variable, $h \in \mathbb{R}^{n_x}$
$d_k$: decision variables at instant k
$r_k$: set-points at instant k
$a_k$: actuator manipulations at instant k
$\underline{x}_{k,i}^T$: lower bound on the temperature for the $i^{th}$ zone at the $k^{th}$ instant
$\overline{x}_{k,i}^T$: upper bound on the temperature for the $i^{th}$ zone at the $k^{th}$ instant
$Occ_{k,i}$: occupancy in the $i^{th}$ zone at the $k^{th}$ instant
$\overline{Occ}_{k,i}$: peak occupancy in the $i^{th}$ zone at the $k^{th}$ instant In the energy savings mode, control of the fresh air intake is coupled with zone occupancy. Directly sensing occupancy provides a more immediate indication that $CO_2$ concentrations will start increasing. It will be appreciated that it takes some time for occupancy to result in increasing $CO_2$ concentrations, hence directly measuring occupancy (rather than using $CO_2$ concentrations as a proxy for occupancy) is more responsive.

In some cases, ventilation strategies are evaluated to meet the IAQ requirements when there is least impact on energy consumption and it is most favorable for equipment life expectancy. For example, it may be better to bring in additional fresh air when a building is not occupied, if the outdoor air is cooler and thus requires minimal conditioning in order to meet comfort requirements.

In some cases, ventilation strategies are evaluated to minimize the cost of energy that is consumed by each of the components of the HVAC system 16. In some cases, a thermal comfort band may be used as a constraint, with a penalty on the thermal comfort violation by using a slack variable on the zone temperature. Also, IAQ concentrations may be used as constraints. In some cases, a penalty may be placed on the IAQ bound violation by using a slack variable on IAQ variables ($CO_2$, PM2.5 and TVOC) in the zone.

An illustrative cost function for the energy savings mode is given below:

$$J = \text{Min}\left[\sum_{k=0}^{N_c-1}\|R_k l(d_k)\|_1 + \sum_{k=0}^{N-1}\sum_{i=1}^{N_Z}\left(\|Q_k f(z_{k,i})\|_2^2 + \|P_k h(s_{k,i})\|_2^2\right)\right]$$

where:

$$\sum_{k=0}^{N_c-1}\|R_k l(d_k)\|_1$$

This term is the cost associated with energy expenditure;

$$\Sigma_{k=0}^{N-1}\Sigma_{i=0}^{N_z}\|Q_k f(z_{k,i})\|_2^2$$

This term represents the cost associated with thermal comfort violations; and $$\Sigma_{k=0}^{N-1}\Sigma_{i=0}^{N_z}\|P_k h(s_{k,i})\|_2^2$$

This term represents the cost associated with IAQ variables bound violations.

It will be appreciated that the illustrative cost function for the energy savings mode is subject to a number of constraints listed below:

Constraints (s.t.)
x(k+1)=Ax(k)+Bu(k)+Ww(k) (System dynamics)
x(0)=$x_0$ (Initial state estimate: y→[obsrvler]→x)
$Gd_k \leq g$ (Constraint on the decision variables)
$H\Delta d_k \leq h$ (Constraints on the rate change of decision variables)
where, $d_k=[r_k, a_k]$
(observed states at each iteration should always satisfy:)
$\underline{x}_{k,i}^T - z_{k,i}^T \leq x_{k,i}^T \leq \overline{x}_{k,i}^T + z_{k,i}$
$0 \leq x_{k,i}^{IAQ} \leq \overline{x}_{k,i}^{IAQ,A} + s_{k,i}$
$0 \leq z_{k,i} \leq \overline{z}_{k,i}$
$0 \leq s_{k,i} \leq \overline{s}_{k,i}$
where, $i \in [N_z]$
Expect, Guaranteed feasibility.

In the productivity mode, zone-wise IAQ concentrations (and any other contaminants of concern) are maintained at least to the levels defined by ASHRAE. It is known that productivity of occupants of a building may increase with lower IAQ concentrations. Using zone-wise control for IAQ levels means considering zone-wise occupancy levels, environmental factors and optimizing energy consumption. For example, if a first zone is unoccupied while a second zone is at capacity, the second zone will receive more fresh air, if not substantially more fresh air, relative to the first zone. In some cases, IAQ concentrations within the zones may be measured and used as another control feature.

An illustrative cost function for the productivity mode is as follows:

$$J = \text{Min}\left[\sum_{k=0}^{N-1}\sum_{i=1}^{N_Z}(x_k^{IAQ} - \overline{x}_k^{IAQ,P}) - \left(1 - h - \overline{x}_{I,k}^{IAQ}\right)\sum_{k=0}^{N_c-1}\|R_k l(d_k)\|_1 + \right.$$
$$\left.\sum_{k=0}^{N-1}\sum_{k=0}^{N_Z}\left(\|Q_k f(z_{k,i})\|_2^2 + \|P_k o(s_{k,i})\|_2^2\right)\right]$$

where:

$$\sum_{k=0}^{N-1}\sum_{i=1}^{N_Z}(x_k^{IAQ} - \overline{x}_k^{IAQ,P})$$

This term pertains to meeting IAQ thresholds within each zone as per the set IAQ standards in the productivity mode, where the IAQ thresholds adjust dynamically as occupancy changes;

$$(1-h(x_{i,k}^{IAQ}))$$

Figure 11:
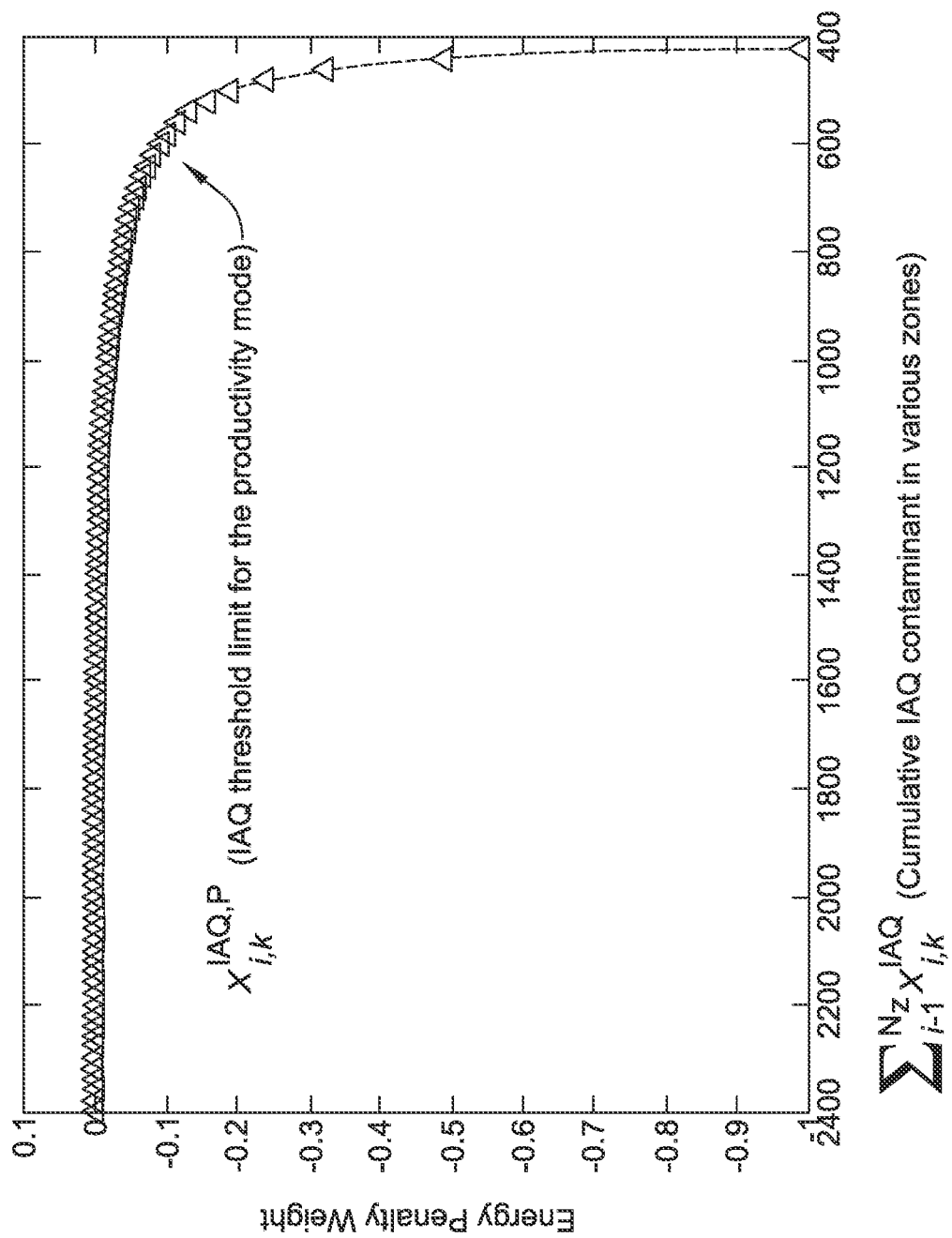
FIG. 11 is a graph showing an example of energy penalty weighting relative to cumulative IAQ concentration.

This term pertains to minimizing energy cost expenditure as the cumulative IAQ measures in various zones reaches close to the threshold IAQ. This can be seen in FIG. 11, which is a graph of energy penalty weight (ranging from 0 to −1) versus cumulative IAQ concentrations. As can be seen, the energy penalty weight remains at or close to zero until the cumulative IAQ concentration becomes high. Alternatively, the function h(.) could also be expressed as a function of the IAQ concentrations in the return air duct (e.g. sensed by a sensor). In some cases, however, this may result in passive control of the energy term.

Moreover:

$$\Sigma_{k=0}^{N_c-1}\|R_k l(d_k)\|_1$$

This term pertains to the cost associated with energy consumption;

$$\Sigma_{k=0}^{N-1}\Sigma_{i=1}^{N_z}\|Q_k f(z_{k,i})\|_2^2$$

This term pertains to the cost associated with thermal comfort violations; and $$\Sigma_{k=0}^{N-1}\Sigma_{i=1}^{N_z}P_k o(s_{k,i})$$

This term pertains to the cost associated with IAQ variables bound violations.

It will be appreciated that the illustrative cost function for the productivity mode is subject to a number of constraints listed below:
where, $$\overline{x}_{i,k}^{IAQ,P} = \psi(\overline{Occ}_i, Occ_i, \overline{x}_{i,k}^{IAQ}, \underline{x}_{i,k}^{IAQ})$$

The lower and upper limits on the IAQ contaminants concentration for the productivity mode, i.e., $\overline{x}_{i,k}^{IAQ}$ and $\underline{x}_{i,k}^{IAQ}$, respectively, is set by the operator.

One of the possible descriptions for $\overline{x}_{i,k}^{IAQ,P}$ expressed as an affine function is given as:

$$\overline{x}_{i,k}^{IAQ,P} = \underline{x}_{i,k}^{IAQ} + \left(\overline{x}_{i,k}^{IAQ,P} - \underline{x}_{i,k}^{IAQ}\right)\frac{Occ_{i,k}}{\overline{Occ}_{i,k}}$$

However, the function could also be a non-linear map between the Occupancy and contaminant concentration.

The function which weights the energy objective as a function of the IAQ variables concentration is expressed as:

$$h(x_{i,k}^{IAQ}) = \frac{\sum_{i=1}^{N_z}\overline{x}_{i,k}^{IAQ,P} - 0.99\sum_{i=1}^{N_z}x_{i,k}^{IAQ}}{\sum_{i=1}^{N_z}\overline{x}_{i,k}^{IAQ,P} - \sum_{i=1}^{N_z}x_{i,k}^{IAQ}}$$

It will be appreciated that the illustrative cost function for the productivity mode is subject to a number of constraints listed below:
Constraints (s.t.)
x(k+1)=Ax(k)+Bu(k)+Ww(k) (System dynamics)
x(0)=$x_0$ (Initial state estimate: y→[obsrver]→x)
G$d_k$≤g (Constraint on the decision variables)
HΔ$d_k$≤h (Constraints on the rate change of decision variables)
where, $d_k$=[$r_k$, $a_k$]
(observed states at each iteration should always satisfy:)
$\underline{x}_{k,i}^T - z_{k,i} \leq x_{k,i}^T \leq \overline{x}_{k,i}^T + z_{k,i}$
$0 \leq x_{k,i}^{IAQ} \leq \overline{x}_{i,k}^{IAQ,A} + s_{k,i}$
$0 \leq z_{k,i} \leq \overline{z}_{k,i}$
$0 \leq s_{k,i} \leq \overline{s}_{k,i}$
where, i∈[$N_z$]
Expect, Guaranteed feasibility.
In particular:
($x_{i,k}^{IAQ} - \overline{x}_{i,k}^{IAQ,P}$) denotes the differential between the IAQ measure ($x_{i,k}^{IAQ}$) and the IAQ threshold ($\overline{x}_{i,k}^{IAQ,P}$), which is defined and set by the user as per the productivity mode for the zone "i";
$\overline{x}_{i,k}^{IAQ,A}$ denotes the IAQ threshold limits defined in accordance with the ASHRAE standards 62.1 and 62.2;
$x_{i,k}^{IAQ}$ is a function of actuator manipulations ($a_k$) and the setpoints ($r_k$);

The functional relationships among the variables are established as part of the energy model, which is based on system dynamics. $f(z_k)$ is a function of the slack variable $z_k$ and is used to capture the cost related to thermal discomfort. o ($s_k$) is a function of the slack variable $s_k$ and is used to capture the cost related to IAQ limit violations. As the thermal comfort and/or the IAQ contaminant concentration band starts to be violated, the cost function starts to penalize the deviation from the corresponding band.

An objective is to minimize IAQ concentrations to the levels defined and set as per the productivity mode. In some cases, a cumulative sum of IAQ concentrations may be used to trigger energy minimization when the contaminants reach close to the threshold defined as per the productivity mode. Worst case IAQ levels to be met while in the productivity mode may be those as defined per the ASHRAE standards.

It will be appreciated that the building space 12 may switch between modes. This can be done as a hard switch or a soft switch. A hard switch involves switching directly from a first mode to a second mode, with no intervening positions or mode. This can result in a large demand for instant control inputs. In some cases, a hard switch can damage equipment such as actuators over time if the specifications of the first mode and the second mode are substantially different. In contrast, a soft switch means switching from the first mode to the second mode over a number of intermediate control steps. This provides a smoother transition between the first mode and the second mode, and can thus increase the life of building equipment such as actuators.

Figure 12:
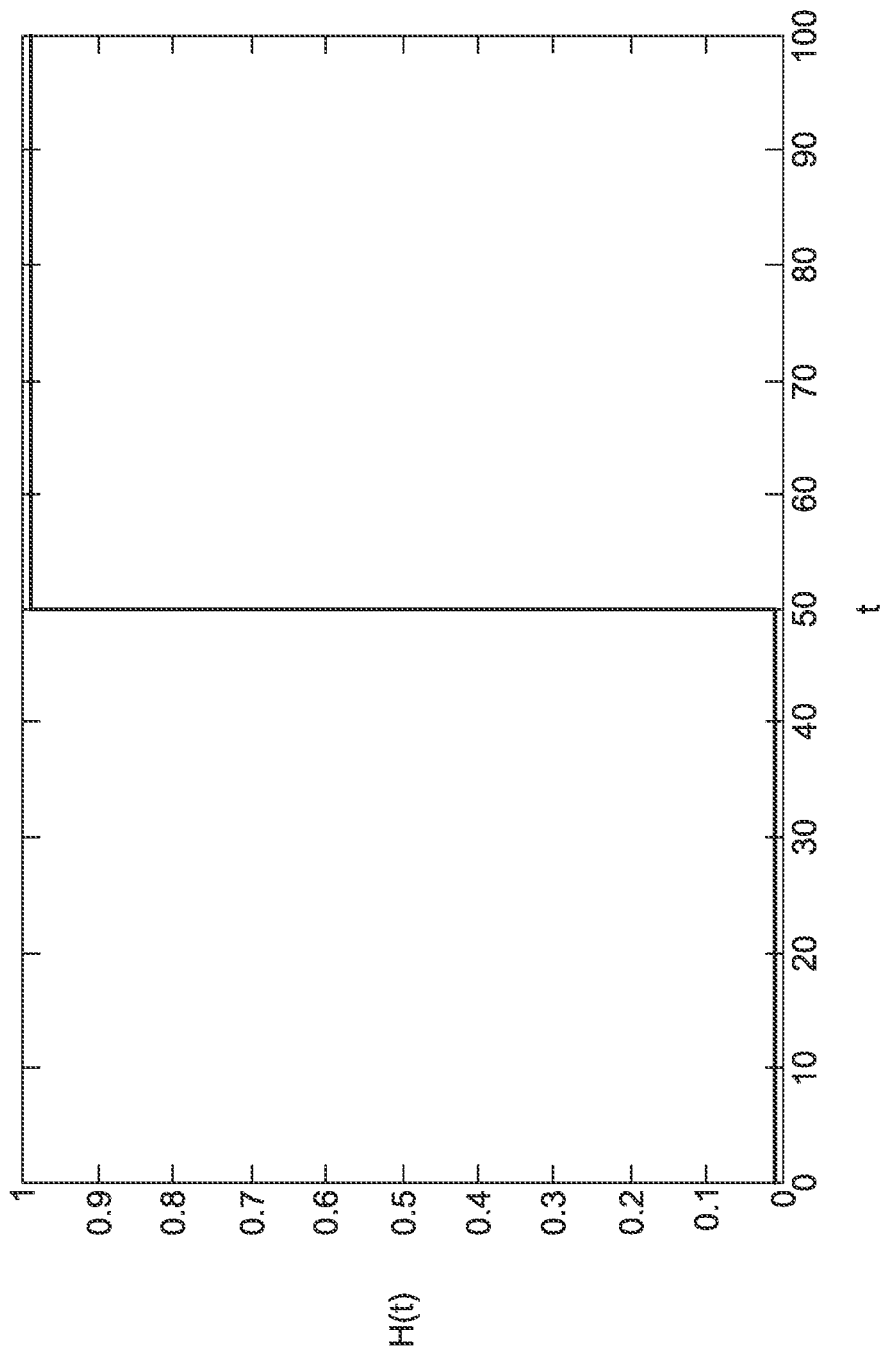
FIG. 12 is a graph showing an example of a Heaviside function.

Soft switching involves switching from one mode to the other in a smoother manner by implementing intermediate MPC (model predictive control) over a number of control steps. Switching between the initial mode and the final mode happens using a soft switching coefficient beta (β) that relates the input and state variables of the two modes:

$U^S = \beta U_I + (1-\beta) U_F$ $X^S = \beta X_I + (1-\beta) X_F$ where,
$U^S$ and $X^S$ are the input and state variables, respectively, for intermediate MPC;
$U_I$ and $X_I$ are the input and state variables for the initial mode;
$U_F$ and $X_F$ are the input and state variables for the final mode.
The switching coefficient beta (β) is given by:

$$\beta_k(i) = \left[1 - \left(\frac{k+i-k_b}{\tau_{sw}}\right)\right] H\left(1 - \left(\frac{k+i-k_b}{\tau_{sw}}\right)\right)$$

where,
H(.) is the Heaviside function, which as shown in FIG. 12 is a step function that switches from 0 to 1 in the time interval $\tau_{sw}$;
switching starts at $k_b$ and ends at $k_e$; and
$\tau_{sw} = k_b - k_e$ is the switching interval.

Figure 13:
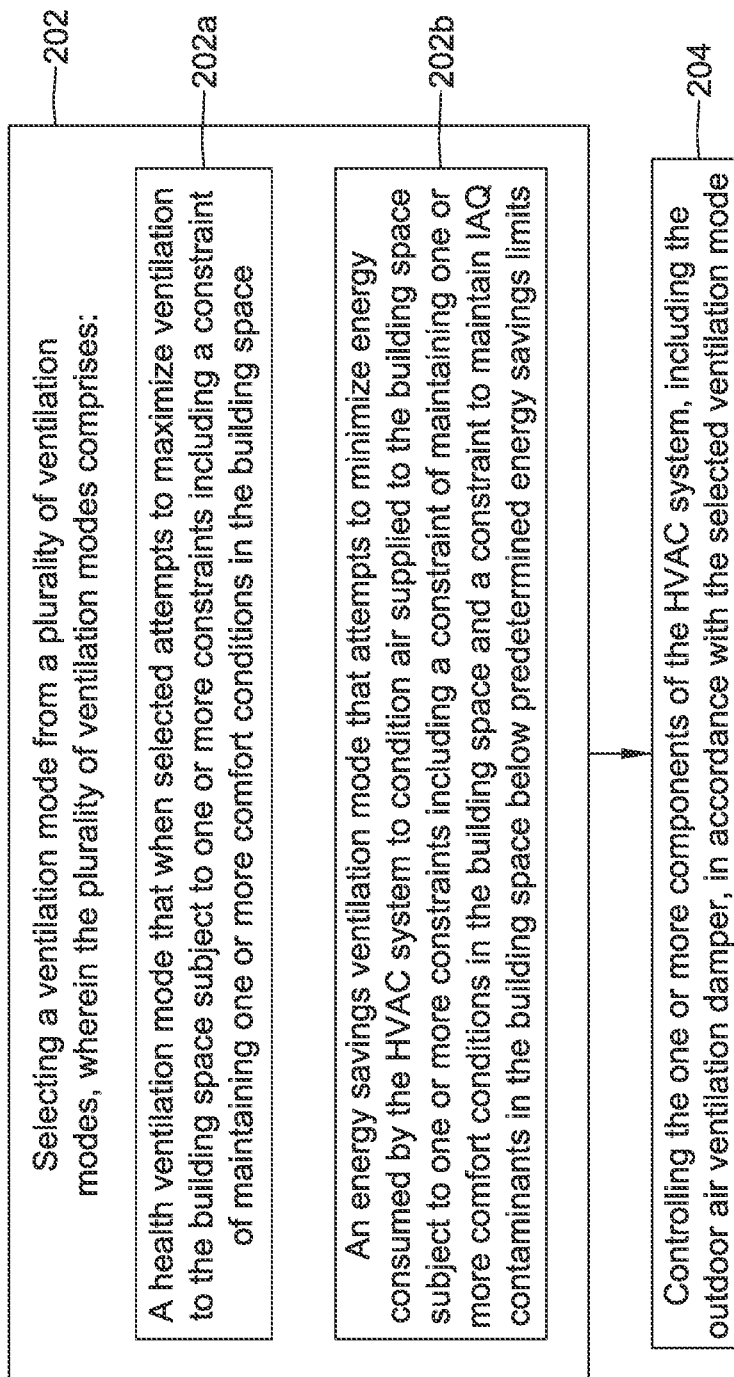
FIG. 13 is a flow diagram showing an illustrative method.

FIG. 13 is a flow diagram showing an illustrative method 200 for providing dynamic ventilation for a building space (such as the building space 12) serviced by a Heating, Ventilating and Air Conditioning (HVAC) system (such as the HVAC system 16) with one or more components including an outdoor air ventilation damper (such as the damper 18). The method 200 includes selecting a ventilation mode from a plurality of ventilation modes, as indicated at block 202. The plurality of ventilation modes include a health ventilation mode that when selected attempts to maximize ventilation to the building space subject to one or more constraints including a constraint of maintaining one or more comfort conditions in the building space, as indicated at block 202a. The plurality of ventilation modes include an energy savings ventilation mode that attempts to minimize energy consumed by the HVAC system to condition air supplied to the building space subject to one or more constraints including a constraint of maintaining one or more comfort conditions in the building space and a constraint to maintain IAQ contaminants in the building space below predetermined energy savings limits, as indicated at block 202b. The method 200 includes controlling one or more components of the HVAC system, including the outdoor air ventilation damper, in accordance with the selected ventilation mode, as indicated at block 204.

In some cases, the plurality of ventilation modes includes a productivity ventilation mode that when selected attempts to control ventilation to the building space to maintain IAQ contaminants in the building space below predetermined productively limits subject to one or more constraints including a constraint of maintaining one or more comfort conditions in the building space. In some cases, at least one of the predetermined productively limits is below a corresponding one of the predetermined energy savings limits.

In some cases, when the health ventilation mode is selected, controlling the one or more components of the HVAC system, including the outdoor air ventilation damper, includes minimizing an overall cost associated with a ventilation term for maximizing outdoor air ventilation to the building space, an energy term for minimizing energy associated with outdoor air ventilation to the building space, and a comfort term for penalizing a deviation from one or more comfort conditions in the building space. In some instances, when the energy savings ventilation mode is selected, controlling the outdoor air ventilation damper includes minimizing an overall cost associated with an energy term for minimizing energy associated with outdoor air ventilation to the building space, a comfort term that penalizes a deviation from one or more comfort conditions in the building space, and an Indoor Air Quality (IAQ) term that penalizes violations of one or more predetermined IAQ limits. In some cases, the comfort term and the IAQ term may each include one or more slack variables.

FIG. 14 is a flow diagram showing an illustrative method 206 for providing dynamic ventilation for a building space (such as the building space 12) serviced by a Heating, Ventilating and Air Conditioning (HVAC) system (such as the HVAC system 16) with one or more components including an outdoor air ventilation damper (such as the damper 18). The method 206 includes selecting a ventilation mode from a plurality of ventilation modes, as indicated at block 208. In some cases, the ventilation mode may be selected by an operator. In some instances, the ventilation mode may be automatically selected in accordance with a programmed schedule.

The plurality of ventilation modes includes a first ventilation mode that attempts to minimize energy consumed by the HVAC system to condition air supplied to the building space while maintaining one or more IAQ contaminants in the building space below one or more corresponding first predetermined limits, as indicated at block 208a. The plurality of ventilation modes includes a second ventilation mode that attempts to minimize energy consumed by the HVAC system to condition air supplied to the building space while maintaining one or more IAQ contaminants in the building space below one or more corresponding second predetermined limits, wherein at least one of the second predetermined limits is below a corresponding one of the first predetermined limits, as indicated at block 208b. The method 206 includes controlling one or more components of the HVAC system, including the outdoor air ventilation damper, in accordance with the selected ventilation mode, as indicated at block 210.

Figure 15:
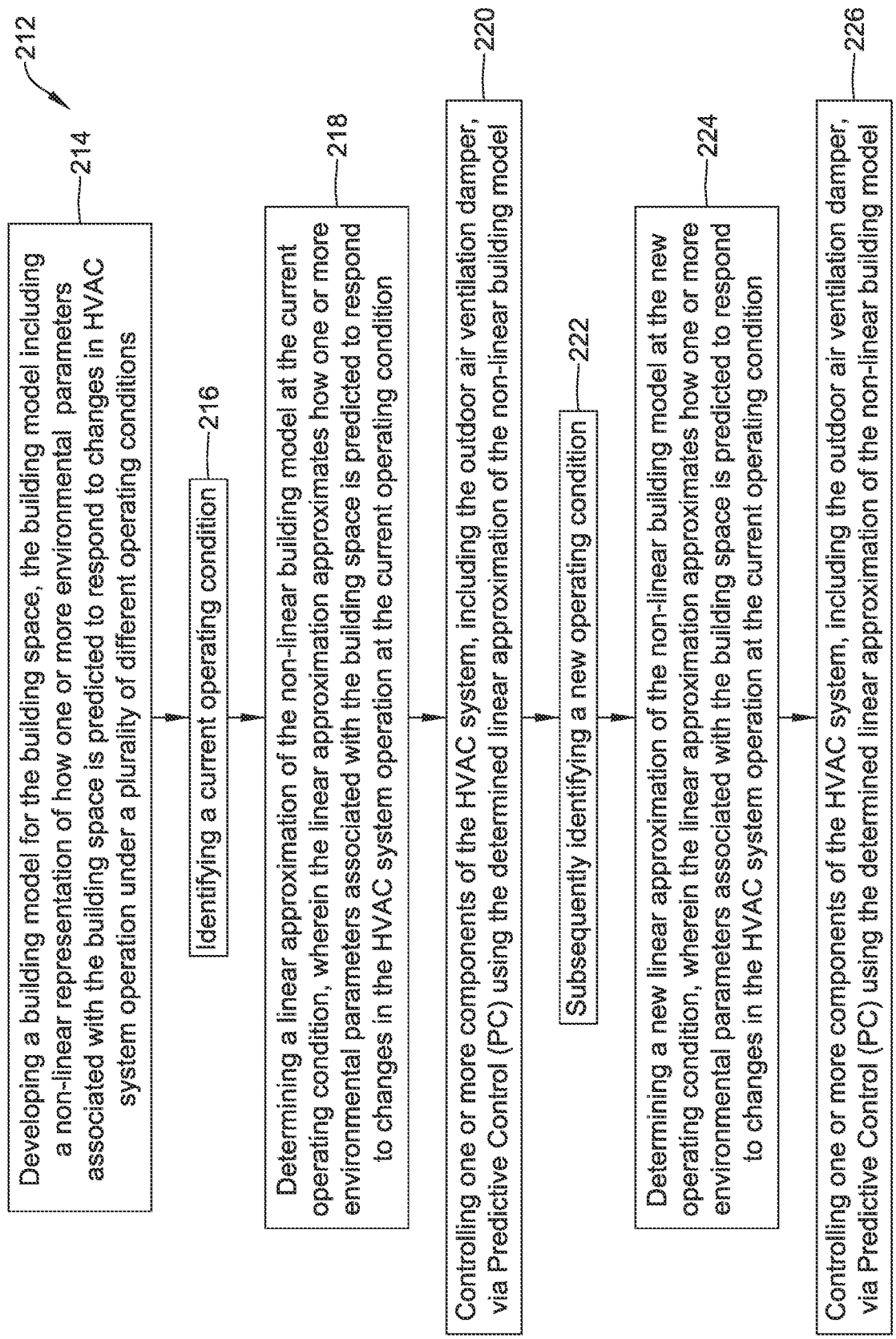
FIG. 15 is a flow diagram showing an illustrative method.

FIG. 15 is a flow diagram showing an illustrative method 212 for providing dynamic ventilation for a building space (such as the building space 12) serviced by a Heating, Ventilating and Air Conditioning (HVAC) system (such as the HVAC system 16) with an outdoor air ventilation damper (such as the damper 18). The method 212 includes developing a building model for the building space, the building model including a non-linear representation of how one or more environmental parameters associated with the building space is predicted to respond to changes in HVAC system operation under a plurality of different operating conditions, as indicated at block 214. A current operating condition is identified, as indicated at block 216. A linear approximation of the non-linear building model at the current operating condition is determined, wherein the linear approximation approximates how one or more environmental parameters associated with the building space is predicted to respond to changes in HVAC system operation at the current operating condition, as indicated at block 218. One or more components of the HVAC system, including the outdoor air ventilation damper, are controlled via Predictive Control (PC) using the determined linear approximation of the non-linear building model, as indicated at block 220.

In some cases, and as indicated at block 222, the method 2112 may further include subsequently identifying a new operating condition. A new linear approximation of the non-linear building model at the new operating condition is determined, wherein the linear approximation approximates how one or more environmental parameters associated with the building space is predicted to respond to changes in HVAC system operation at the new operating condition, as indicated at block 224. One or more components of the HVAC system, including the outdoor air ventilation damper, are controlled via Predictive Control (PC) using the determined new linear approximation of the non-linear building model, as indicated at block 226.

In some cases, controlling the outdoor air ventilation damper via Model Predictive Control (MPC) further includes predicting a future value for one or more Indoor Air Quality (IAQ) parameters in the building space using the determined linear approximation of the non-linear building model, and controlling one or more components of the HVAC system, including the outdoor air ventilation damper, to control the one or more IAQ parameters in the building space in accordance with one or more thresholds. In some cases, the one or more thresholds may include an ASHRAE standard threshold for each of the one or more IAQ parameters. The one or more thresholds may include a determined value for each of the one or more IAQ parameters that is expected to produce an enhanced productivity level of occupants in the building space.

In some cases, controlling one or more components of the HVAC system, including the outdoor air ventilation damper, via Predictive Control (PC) using the determined linear approximation of the non-linear building model includes selecting a ventilation mode out of a plurality of ventilation modes, each ventilation mode having a different cost function, identifying the cost function for the selected ventilation mode, and controlling one or more components of the HVAC system, including the outdoor air ventilation damper, via Model Predictive Control (MPC), wherein the MPC minimized the identified cost function when controlling the one or more components of the HVAC system.

In some instances, one of the plurality of ventilation modes includes a health ventilation mode in which the Predictive Control (PC) maximizes ventilation to the building space subject to one or more constraints including a constraint of maintaining one or more comfort conditions in the building space. The cost function for the health ventilation mode includes minimizing an overall cost associated with a ventilation term for maximizing outdoor air ventilation to the building space, an energy term for minimizing energy associated with outdoor air ventilation to the building space, and a comfort term for penalizing a deviation from the one or more comfort conditions in the building space.

In some instances, one of the plurality of ventilation modes includes an energy savings ventilation mode in which the Predictive Control (PC) attempts to minimize energy consumed by the HVAC system to condition air supplied to the building space subject to one or more constraints including a constraint of maintaining one or more comfort conditions in the building space and a constraint to maintain IAQ contaminants in the building space below predetermined energy savings limits. The cost function for the energy savings ventilation mode includes minimizing an overall cost associated with an energy term for minimizing energy associated with outdoor air ventilation to the building space, a comfort term that penalizes a deviation from one or more comfort conditions in the building space, and an indoor air quality (IAQ) term that penalizes violations of one or more predetermined IAQ limits.

In some instances, one of the plurality of ventilation modes includes a productivity ventilation mode in which the Predictive Control (PC) attempts to minimize energy consumed by the HVAC system to condition air supplied to the building space subject to one or more constraints including a constraint of maintaining one or more comfort conditions in the building space and a constraint to maintain IAQ contaminants in the building space below predetermined productively limits, wherein at least one of the predetermined productively limits is below a corresponding one of the predetermined energy savings limits.

Figure 16:
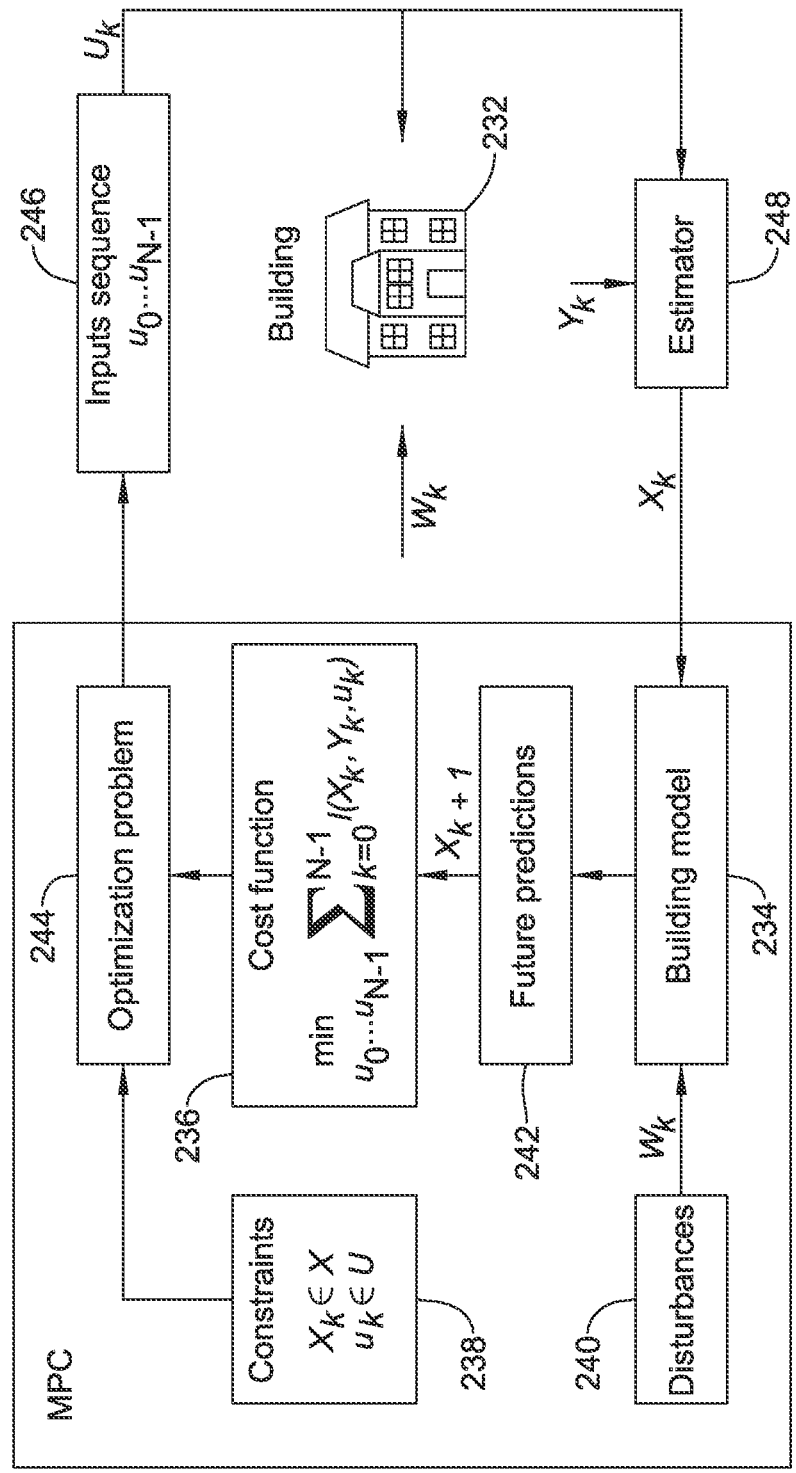
FIG. 16 is a schematic view of an illustrative MPC architecture for building control.

FIG. 16 is a schematic view of an illustrative MPC architecture 230 for building control. The MPC architecture 230 may be used in controlling a variety of functions within a building 232. The building 232 may represent the building space 12, for example. A building model 234 is built to represent the building 232, and can be used via MPC control to model how the building 232 will respond to various inputs. The inputs can include control inputs to various building systems, such as but not limited to the HVAC system 16. The inputs can also include the environmental conditions outside the building 232, such as but not limited to wind, outdoor temperature, solar load, outdoor humidity, outdoor AIQ concentrations, and the like. Because the performance of the building 232 may vary for a variety of reasons, the building model 234 may not be static, but instead may be dynamic such that the building model 234 can be updated over time in order to represent and model changing conditions and parameters for the building 232. In some cases, the model structure of the building model 234 may remain fixed, but the model parameters may evolve over time. This may result in an Adaptive Model Predictive Control (AMPC) of the HVAC system, and in particular an Adaptive Model Predictive Control (AMPC) the ventilation provided by the HVAC system. In some cases, the model parameters of the building model 234 may be updated using machine learning and/or artificial intelligence.

In some cases, the building model 234 is included in the MPC formulation as part of the constraints, namely the system dynamics show below:

Constraints (s.t.)
$x(k+1)=A_k x(k)+B_k u(k)+W_k w(k)$ (System dynamics)
$x(0)=x_0$ (Initial state estimate: y→[obsrver]→x)
$Gu_k \leq g$ (Constraint on the MVs)
$H\Delta u_k \leq h$ (Constraints on the rate change of MVs)

It will be appreciated that the MPC architecture 230 includes a cost function block 236, representing the cost functions described herein with respect to health mode, energy mode and productivity mode, for example. A constraints block 238 represents and accounts for the various constraints described herein with respect to the constraints that accompanied each of the cost functions. A Disturbances block 240 represents changes (W) that can impact the building 232 and the building model 234. The illustrative MPC architecture 230 further includes a Future Predictions block 242 that predicts the next iterative state, an Optimization block 244 that optimizes the cost function 236, an Inputs block 246 for providing inputs determined by the optimization block 244 to the HVAC system, and an Estimator block 248 for estimating the current state (x) of the HVAC system based on the inputs (u) and the outputs (y) of the HVAC system. During operation, at each time instance, an online optimization problem is solved by the Optimization block 244 to obtain an optimal control input trajectory over a fixed future horizon. The first control input ($u_k$) from the predicted trajectory is implemented. In the next time instant, the optimization problem is re-parametrized and solved with the new state estimate ($x_{k+1}$).

Figure 17:
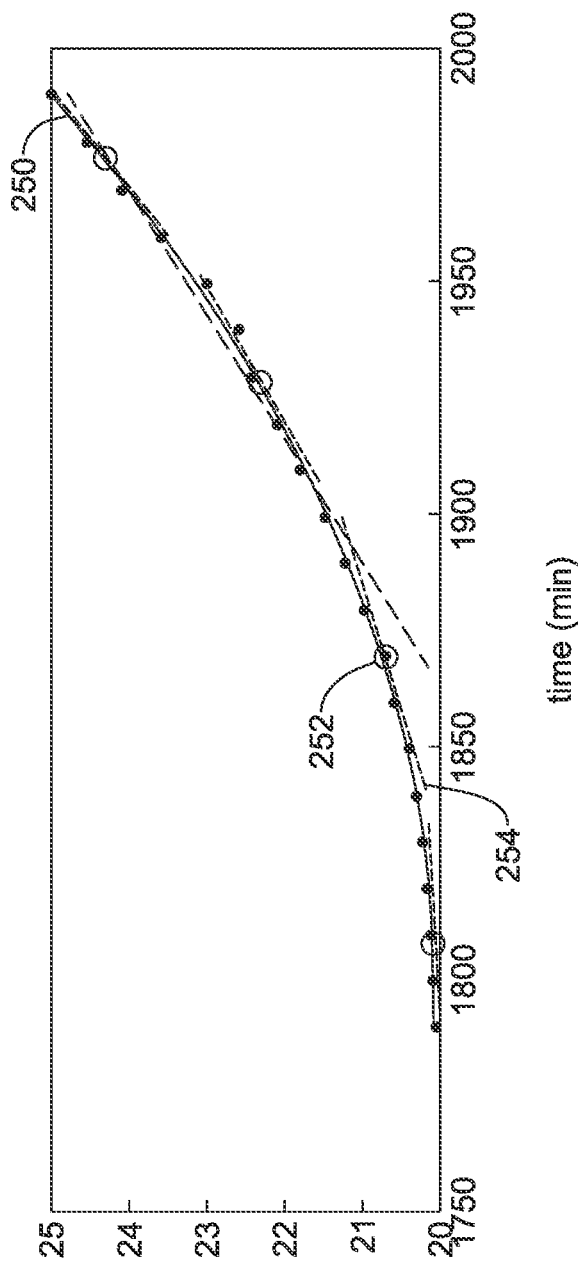
FIG. 17 is a graphical representation of how a building model may include a non-linear representation of how one or more environmental parameters associated with the building space is predicted to respond to changes in HVAC system operation under a plurality of different operating conditions.

FIG. 17 is a graphical representation of how a building model may include a non-linear representation of how one or more environmental parameters associated with the building space is predicted to respond to changes in HVAC system operation under a plurality of different operating conditions. In this particular example, temperature is plotted versus time along a plot line 250. It can be seen that the plot line 250 is non-linear. In some cases, and as referenced for example in FIG. 13, once a current operating condition has been identified (temperature, in this case), a linear approximation to the non-linear building model can be utilized. Say that the current temperature is indicated at a graph point 252. A linear approximation 254, which for example may be considered as being a tangent line drawn through the graph point 252, may be used for enabling MPC control because MPC control requires a linear model. As the temperature changes, an updated linear approximation is selected that corresponds to the updated temperature.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for providing up to a maximum ventilation for a building space while not compromising on one or more comfort conditions in the building space using a Heating, Ventilating and/or Air Conditioning (HVAC) system that includes an outdoor air ventilation damper, the HVAC system including a heating and/or cooling capacity, the method comprising:

tracking one or more interior environmental conditions within the building space and one or more exterior environmental conditions outside of the building space during operation of the HVAC system;

learning an environmental model for the building space over time based at least in part on the tracked one or more interior environmental conditions within the building space and the one or more exterior environmental conditions outside of the building space during operation of the HVAC system, wherein the environmental model predicts an environmental state of the building space in response to operation of the HVAC system under various interior and exterior environmental conditions;

predicting a current maximum allowed ventilation rate of outside air having the one or more exterior environmental conditions that can be conditioned by the HVAC system without exceeding the heating and/or cooling capacity of the HVAC system and without causing the HVAC system to compromise on any of the one or more comfort conditions of the building space, wherein predicting the current maximum allowed ventilation rate comprises inputting to the environmental model of the building space one or more comfort parameters associated with the one or more comfort conditions of the building space, one or more current interior environmental conditions and one or more current exterior environmental conditions; and controlling the outdoor air ventilation damper of the HVAC system to provide ventilation up to or at the current maximum allowed ventilation rate.

2. The method of claim 1, wherein the one or more interior environmental conditions include one or more of indoor air temperature, indoor humidity and concentrations of one or more indoor pollutants.

3. The method of claim 1, wherein the one or more exterior environmental conditions include one or more of outdoor temperature, outdoor humidity and one or more outdoor pollutants.

4. The method of claim 1, further comprising:
tracking occupancy of the building space over time;
tracking how one or more interior environmental conditions change in conjunction with changes in occupancy; and
learning the environmental model for the building space over time based at least in part on the tracked occupancy of the building space and how the one or more interior environmental conditions changes in conjunction with changes in occupancy.

5. The method of claim 4, wherein tracking occupancy of the building space over time comprises using one or more of video analytics to analyze one or more video streams to ascertain occupancy of the building space, using sensors to detect occupancy within a zone of the building space, and using sensors to detect individuals entering and/or exiting a zone of the building space.

6. The method of claim 1, further comprises using the environmental model for the building space to predict how the one or more comfort conditions in the building space is expected to respond to a change in a ventilation rate when predicting the current maximum allowed ventilation rate that can be achieved without exceeding the heating and/or cooling capacity of the HVAC system and without causing the HVAC system to compromise on any of the one or more comfort conditions of the building space.

7. The method of claim 6, wherein predicting the current maximum allowed ventilation rate comprises inputting to the environmental model one or more of:
a temperature setpoint schedule;
a current humidity setpoint;
a current temperature within the building space;
a current fan status of a fan of the HVAC system;
a current valve status of a valve of the HVAC system;
a current heating and/or cooling load on the HVAC system; and
wherein the current maximum allowed ventilation rate includes a built-in heating and/or cooling capacity margin.

8. The method of claim 1, further comprising initiating a purge period in which the HVAC system provides a ventilation rate that is above the current maximum allowed ventilation rate for a period of time.

9. The method of claim 8, wherein the HVAC system is allowed to compromise on one or more of the one or more comfort conditions of the building space during at least part of the purge period.

10. The method of claim 8, wherein the purge period ends at a time prior to a start of a proscribed period of time sufficient to permit the HVAC system to condition the building space and reach the one or more comfort conditions prior to the start of the proscribed period of time.

11. The method of claim 1, wherein the environmental model determines a current unused heating and/or cooling capacity of the HVAC system, and wherein the environmental model uses the determined current unused heating and/or cooling capacity of the HVAC system to predict the current maximum allowed ventilation rate that can be achieved without exceeding the heating and/or cooling capacity of the HVAC system and without causing the HVAC system to compromise on any of the one or more comfort conditions of the building space.

12. The method of claim 11, wherein the environmental model determines a current heating and/or cooling load on the HVAC system, and wherein the environmental model uses the determined current heating and/or cooling load and the determined unused heating and/or cooling capacity of the HVAC system to predict the current maximum allowed ventilation rate that can be achieved without causing the HVAC system to exceed the heating and/or cooling capacity of the HVAC system and without causing the HVAC system to compromise on any of the one or more comfort conditions of the building space.

13. A method for providing a dynamic ventilation rate for a building space using a Heating, Ventilating and/or Air Conditioning (HVAC) system that includes an outdoor air ventilation damper, the method comprising:
tracking over time one or more interior environmental conditions within the building space and one or more exterior environmental conditions outside of the building space during operation of the HVAC system;
learning an environmental model for the building space over time based at least in part on the tracked one or more interior environmental conditions within the building space and the one or more exterior environmental conditions outside of the building space during operation of the HVAC system, wherein the environmental model predicts an environmental state of the building space in response to operation of the HVAC system under various interior and exterior environmental conditions;
determining a dynamic ventilation rate for the HVAC system of the building space based at least in part on inputting to the environmental model of the building space one or more interior environmental conditions and one or more exterior environmental conditions, wherein the determined dynamic ventilation rate is capped at a dynamic maximum allowed ventilation rate that is determined based at least in part on the one or more exterior environmental conditions such that outside air drawn in through the outdoor air ventilation damper at the maximum allowed ventilation rate with the one or more exterior environmental conditions can be conditioned by the HVAC system without exceeding a heating and/or cooling capacity of the HVAC system while maintaining one or more comfort conditions in the building space; and
controlling the outdoor air ventilation damper of the HVAC system to provide ventilation to the building space at the determined dynamic ventilation rate.

14. The method of claim 13, further comprising:
maintaining a measure of occupancy of the building space by counting occupants entering and exiting the building space; and
determining the dynamic ventilation rate comprises compensating the dynamic ventilation rate based on the measure of occupancy of the building space.

15. The method of claim 14, wherein the measure of occupancy is determined using one or more of video feed of an entrance to the building space and a sensor capable of sensing individual occupants that are entering the building space.

16. The method of claim 13, wherein the one or more interior environmental conditions include one or more of indoor air temperature, indoor humidity, and concentrations of one or more indoor pollutants.

17. The method of claim 13, wherein the one or more exterior environmental conditions include one or more of outdoor temperature, outdoor humidity and outdoor pollutants.

18. The method of claim 13, further comprising initiating a purge period in which the HVAC system provides a ventilation rate that is above the cap of the dynamic ventilation rate for a period of time.

19. The method of claim 13, wherein the tracking, learning and determining steps are performed at a location remote from the building space, and the controlling step is performed by the HVAC system of the building space.

20. A method for controlling an outdoor air ventilation damper of a Heating, Ventilating and/or Air Conditioning (HVAC) system serving a building space of a building, the method comprising:
- receiving one or more comfort conditions for the building space, one or more exterior environmental conditions of air outside of the building, and one or more operating conditions of the HVAC system;
- identifying a measure of current unused heating and/or cooling capacity of the HVAC system based at least in part on the one or more operating conditions of the HVAC system;
- determining a maximum ventilation parameter that is representative of a rate of outside air having the one or more exterior environmental conditions that can be conditioned by the measure of current unused heating and/or cooling capacity of the HVAC system while still maintaining the one or more comfort conditions for the building space;
- determining a ventilation rate that is based at least in part on the maximum ventilation parameter; and
- controlling the outdoor air ventilation damper of the HVAC system to provide ventilation at or below the determined ventilation rate.

* * * * *